(12) United States Patent
Kailey et al.

(10) Patent No.: US 11,758,074 B2
(45) Date of Patent: Sep. 12, 2023

(54) COLOR UNIFORMITY COMPENSATION MECHANISM

(71) Applicants: Walter F Kailey, Boulder, CO (US); Mikel Stanich, Boulder, CO (US); Nikita Gurudath, Boulder, CO (US)

(72) Inventors: Walter F Kailey, Boulder, CO (US); Mikel Stanich, Boulder, CO (US); Nikita Gurudath, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/194,103

(22) Filed: Mar. 5, 2021

(65) Prior Publication Data

US 2022/0286581 A1 Sep. 8, 2022

(51) Int. Cl.
  H04N 1/60 (2006.01)
  H04N 1/405 (2006.01)
  B41J 2/21 (2006.01)

(52) U.S. Cl.
  CPC ............ H04N 1/605 (2013.01); B41J 2/2146 (2013.01); H04N 1/405 (2013.01); H04N 1/6008 (2013.01); H04N 1/6016 (2013.01)

(58) Field of Classification Search
  CPC ........... H04N 1/00015; H04N 1/00023; H04N 1/00031; H04N 1/00034; H04N 1/00045;
  (Continued)

(56) References Cited

U.S. PATENT DOCUMENTS 6,270,187 B1    8/2001  Murcia et al.
6,345,128 B1 *  2/2002  Stokes .................. H04N 1/407
                                                    382/254

(Continued)

FOREIGN PATENT DOCUMENTS

EP      0768001 B1 *  3/1996
EP      1197916 A2    4/2002
(Continued)

OTHER PUBLICATIONS

B. Federal Agency Digitization Guidelines, Jan. 9, 2009, Definition of Tone Reproduction Curve (TRC) (Year: 2009).*

(Continued)

Primary Examiner — Barbara D Reinier
(74) Attorney, Agent, or Firm — Jaffery Watson Mendonsa & Hamilton LLP

(57) ABSTRACT

A system is disclosed. The system includes at least one physical memory device to store calibration logic and one or more processors coupled with the at least one physical memory device to execute the calibration logic to receive an image having a blended input color comprising a first primary color value and a second primary color value, generate blend weights for the blended input color based on the first primary color value and the second primary color value, receive a plurality of transfer functions corresponding to each of the first primary color value and the second primary color values and apply the blend weights and the plurality of transfer functions to the first primary color value and the second primary color value to generate a uniformity corrected first primary color value and a uniformity corrected second primary color value associated with the blended input color.

20 Claims, 17 Drawing Sheets

(58) Field of Classification Search
CPC ........... H04N 1/00068; H04N 1/00082; H04N 1/00087; H04N 1/0009; H04N 1/40–4015; H04N 1/58; H04N 1/60–605; G06K 15/027; G06K 15/10–107; G06K 15/18–188

See application file for complete search history.

(56) References Cited

U.S. PATENT DOCUMENTS

| | | | |
|---|---|---|---|
| 7,024,126 | B2 | 4/2006 | Kellie et al. |
| 7,289,248 | B2 | 10/2007 | Yamazaki |
| 7,306,312 | B2 | 12/2007 | Chiwata |
| 7,483,171 | B2 | 1/2009 | Agar |
| 7,864,373 | B2 * | 1/2011 | Donaldson ............ H04N 1/603 399/53 |
| 8,033,630 | B2 | 10/2011 | Miyamoto |
| 8,086,029 | B1 * | 12/2011 | Chien ................ H04N 1/6027 382/167 |
| 8,157,345 | B2 | 4/2012 | Sasayama |
| 8,235,490 | B2 | 8/2012 | Chandu et al. |
| 8,251,476 | B2 | 8/2012 | Shin |
| 8,322,811 | B2 | 12/2012 | Chandu et al. |
| 8,542,418 | B2 | 9/2013 | Chandu et al. |
| 8,573,731 | B2 | 11/2013 | Bastani et al. |
| 8,699,103 | B2 * | 4/2014 | Mestha ............... H04N 1/6041 358/1.9 |
| 8,967,757 | B2 | 3/2015 | Bastani et al. |
| 9,108,402 | B2 | 8/2015 | Sudo |
| 9,302,469 | B2 | 4/2016 | De Grijs |
| 9,463,638 | B1 | 10/2016 | Kroon |
| 9,621,762 | B2 | 4/2017 | Chandu et al. |
| 9,661,154 | B1 | 5/2017 | Stanich et al. |
| 9,785,873 | B2 | 10/2017 | Stanich et al. |
| 9,914,309 | B2 | 3/2018 | Billow |
| 10,082,990 | B2 | 9/2018 | Martin et al. |
| 10,449,759 | B2 | 10/2019 | Trachanas |
| 10,488,846 | B2 | 11/2019 | Donovan |
| 10,538,106 | B2 | 1/2020 | Stritzel |
| 10,549,523 | B2 | 2/2020 | Stanich |
| 11,216,710 | B1 | 1/2022 | Stanich |
| 11,270,171 | B2 | 3/2022 | Fukui |
| 11,281,950 | B2 | 3/2022 | Otani |
| 11,338,591 | B1 | 5/2022 | Kailey |
| 11,368,592 | B1 | 6/2022 | Kailey |
| 2002/0051144 | A1 | 5/2002 | Ilbery et al. |
| 2005/0099446 | A1 | 5/2005 | Mizes et al. |
| 2005/0243340 | A1 | 11/2005 | Tai et al. |
| 2006/0061782 | A1 * | 3/2006 | Yao ..................... H04N 1/6022 358/1.9 |
| 2006/0072160 | A1 | 4/2006 | Yamazaki |
| 2007/0115507 | A1 | 5/2007 | Terekhov et al. |
| 2008/0055355 | A1 * | 3/2008 | Hersch ................ H04N 1/6097 347/19 |
| 2009/0284762 | A1 | 11/2009 | Zhang et al. |
| 2010/0207983 | A1 | 8/2010 | Hiroyuki |
| 2012/0050755 | A1 | 3/2012 | Chandu |
| 2013/0021400 | A1 | 1/2013 | Tamagawa |
| 2013/0076825 | A1 | 3/2013 | Szafraniec |
| 2013/0107290 | A1 * | 5/2013 | Lin ..................... H04N 1/6033 358/1.9 |
| 2013/0176600 | A1 | 7/2013 | Chandu |
| 2013/0293611 | A1 | 11/2013 | Masashi |
| 2014/0071191 | A1 | 3/2014 | Masashi |
| 2014/0313255 | A1 | 10/2014 | Ukishima |
| 2015/0062233 | A1 | 3/2015 | Ueshima |
| 2016/0052318 | A1 | 2/2016 | Humet Pous |
| 2016/0100079 | A1 | 4/2016 | Gerrits |
| 2016/0309056 | A1 | 10/2016 | Wakui |
| 2017/0236041 | A1 | 8/2017 | Stanich |
| 2017/0280022 | A1 | 9/2017 | Kuroiwa |
| 2018/0008995 | A1 | 1/2018 | Baker et al. |
| 2018/0022131 | A1 | 1/2018 | Klinger et al. |
| 2018/0234582 | A1 | 8/2018 | Stanich et al. |
| 2018/0236776 | A1 | 8/2018 | Stanich et al. |
| 2019/0389227 | A1 | 12/2019 | Stanich et al. |
| 2020/0094546 | A1 | 3/2020 | Samadzadegan |
| 2020/0247137 | A1 | 8/2020 | Ryosuke et al. |
| 2021/0339522 | A1 | 11/2021 | Shibata |
| 2022/0083826 | A1 | 3/2022 | Stanich |

FOREIGN PATENT DOCUMENTS

| | | |
|---|---|---|
| EP | 1157840 B1 | 7/2007 |
| JP | 2018133801 A | 8/2018 |
| WO | 2008059264 A1 | 5/2008 |

OTHER PUBLICATIONS

Office Action from U.S. Appl. No. 16/995,999, dated May 10, 2021, 15 pages.
Office Action for U.S. Appl. No. 17/194,133, 14 pages, dated Jan. 13, 2022.
Extended European Search Report for EP21191026.0, 11 pages, dated Jan. 5, 2022.
Office Action for U.S. Appl. No. 17/193,906, dated Nov. 23, 2021, 16 pages.
Hansen et al., "High-Throughput Printing via Microvascular Multinozzle Arrays", Advanced Materials, 25(1), pp. 96-102.
Vantram, S. R. (2014). Fully Automated Calibration Procedure to Compensate Print Non-uniformities Incurred in Fixed Print-head Array Structures. Retrieved from https://jp.ricoh.com/-/Media/Ricoh/Sites/jp_ricoh/technology/techreport/39/pdf/RTR39a18.pdf See highlighted sections.
International Search Report and Written Opinion for PCT/JP2022/009086, dated Jun. 2, 2022, 12 pages.
Office Action for U.S. Appl. No. 17/534,617, dated Jul. 1, 2022, 30 pages.
Office Action for U.S. Appl. No. 17/194,125, dated Apr. 21, 2022, 20 pages.
Final Office Action from U.S. Appl. No. 17/534,617, dated Sep. 9, 2022, 30 pages.
International Search Report and Written Opinion for PCT/JP2022/008654, dated Jun. 17, 2022, 15 pages.
Extended European Search Report for EP22159749, dated Jul. 19, 2022, 8 pages.
Office Action from U.S. Appl. No. 17/534,617, dated Feb. 28, 2023, 15 pages.

* cited by examiner mult_array(:,:,1) =

254 230 90 16 2 25 82 222
247 214 132 41 8 58 156 189
99 148 181 140 74 123 173 107
33 66 165 206 239 197 115 49
2 25 82 222 255 230 90 16
8 58 156 189 247 214 132 41
74 123 173 107 99 148 181 140
239 197 115 49 33 66 165 206 mult_array(:,:,2) =

252 228 88 14 1 22 80 219
244 211 129 38 5 55 154 186
96 145 178 137 71 121 170 104
30 63 162 203 236 195 112 47
1 22 80 219 252 228 88 14
5 55 154 186 244 211 129 38
71 121 170 104 96 145 178 137
236 195 112 47 30 63 162 203 mult_array(:,:,3) =

250 225 85 11 0 19 77 217
241 208 126 36 3 52 151 184
93 143 175 134 69 118 167 101
27 60 159 200 233 192 110 44
0 19 77 217 250 225 85 11
3 52 151 184 241 208 126 36
69 118 167 101 93 143 175 134
233 192 110 44 27 60 159 200

COLOR UNIFORMITY COMPENSATION MECHANISM

FIELD OF THE INVENTION

The invention relates to the field of image reproduction, and in particular, to uniformity correction.

BACKGROUND

When correcting cross-web spatial non-uniformity of a print engine with multiple fixed print heads, relatively large non-uniformities may occur at the junction between the print heads and within a printhead. However, correction of each print head nozzle using interpolated reflectance measurements does not fix this problem since the correction of each nozzle affects the reflectance of nearby locations, and because gaps or overlaps between print head segments are not accounted for when nozzles are independently compensated.

Moreover, fiducial marks at the print head segment boundaries can be used to accurately locate individual nozzles. This facilitates deriving a transfer function for each individual nozzle within a print head, so that the corrections based on measurements precisely centered on each nozzle can be applied to the proper nozzle. Nonetheless, the print head segment boundaries remain uncontrolled, and corrections to nearby nozzles will continue to interact.

Furthermore, creating uniformity compensation based on measurements of C,M,Y,K primary colors can generate suboptimal results when printing using secondary colors, Red, Green or Blue. Secondary colors are produced by a combination of the primary colors. In some cases, acceptable variations in uniformity for each primary color will produce uniformity that is not acceptable when printing a secondary color.

Accordingly, a mechanism to perform nozzle uniformity compensation, based on both primary and secondary colors, is desired.

SUMMARY

In one embodiment, a system is disclosed. The system includes at least one physical memory device to store calibration logic and one or more processors coupled with at least one physical memory device to execute the calibration logic to receive an image having a blended input color comprising a first primary color value and a second primary color value, generate blend weights for the blended input color based on the first primary color value and the second primary color value, receive a plurality of transfer functions corresponding to each of the first primary color value and the second primary color values and apply the blend weights and the plurality of transfer functions to the first primary color value and the second primary color value to generate a uniformity corrected first primary color value and a uniformity corrected second primary color value associated with the blended input color.

BRIEF DESCRIPTION OF THE DRAWINGS

A better understanding of the present invention can be obtained from the following detailed description in conjunction with the following drawings, in which.

DETAILED DESCRIPTION

A uniformity compensation mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
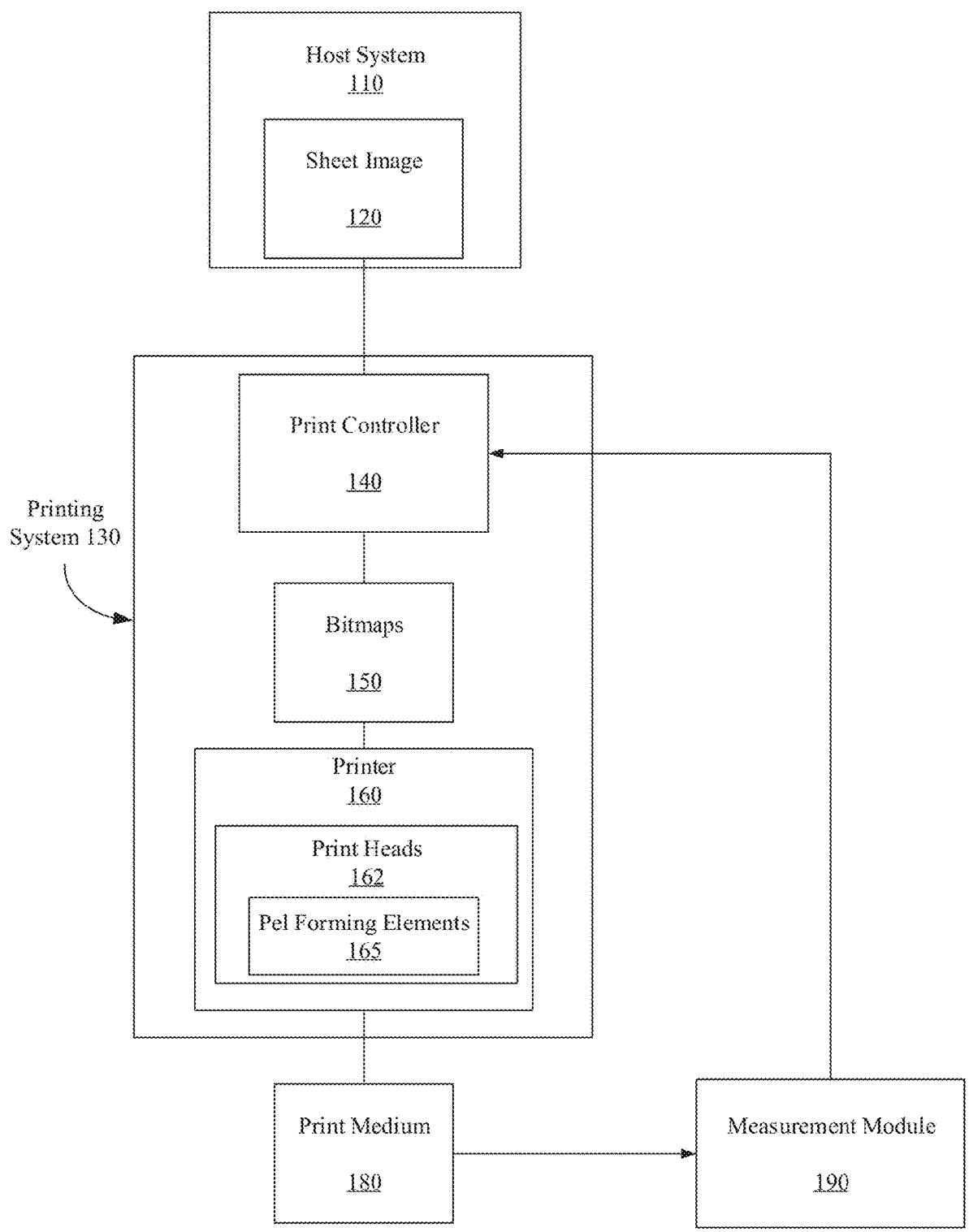
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser). The pel forming elements may be grouped onto one or more printheads. The pel forming elements 165 may be stationary (e.g., as part of a stationary printhead) or moving (e.g., as part of a printhead that moves across the print medium 180) as a matter of design choice. The pel forming elements 165 may be assigned to one of one or more color planes that correspond to types of marking materials (e.g., Cyan, Magenta, Yellow, and blacK (CMYK)). These types of marking materials may be referred to as primary colors.

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head) or separate physical structures. The resulting print medium 180 may be printed in color and/or in any of a number of gray shades, including black and white (e.g., Cyan, Magenta, Yellow, and blacK, (CMYK) and secondary colors (e.g., Red, Green and Blue), obtained using a combination of two primary colors). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. Bitmap 150 may be a halftoned bitmap (e.g., a calibrated halftone bit map generated from calibrated halftones, or uncalibrated halftone bit map generated from uncalibrated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a halftone calibration system to obtain measurements of the printed medium 180. The measured results are communicated to print controller 140 to be used in the halftone calibration process. The measurement system may be a stand-alone process or be integrated into the printing system 130.

According to one embodiment, measurement module 190 may be a sensor to take optical measurements of printed images on print medium 180. Measurement module 190 may generate and transmit measurement data 222. Measurement data 222 may be OD (e.g., optical density) and/or perceptual lightness (e.g., L* in the CIELAB color space L*a*b*) data corresponding to a printed image. In one embodiment, measurement module 190 may comprise one or more sensors that each or in total take measurements for printed markings produced for some or all pel forming elements 165. In another embodiment, measurement module 190 may be a camera system, in-line scanner, densitometer or spectrophotometer. In a further embodiment, measurement data 222 may include a map information to correlate portions of the measurement data 222 (e.g., OD data) to the corresponding pel forming elements 165 that contributed to the portions of the measurement data 222. In another embodiment, the print instructions for a test pattern (e.g., step chart) provides the correlation of the portions of the measurement data to the corresponding pel forming elements that contributed to the portions of the measurement data 222.

Figure 2:
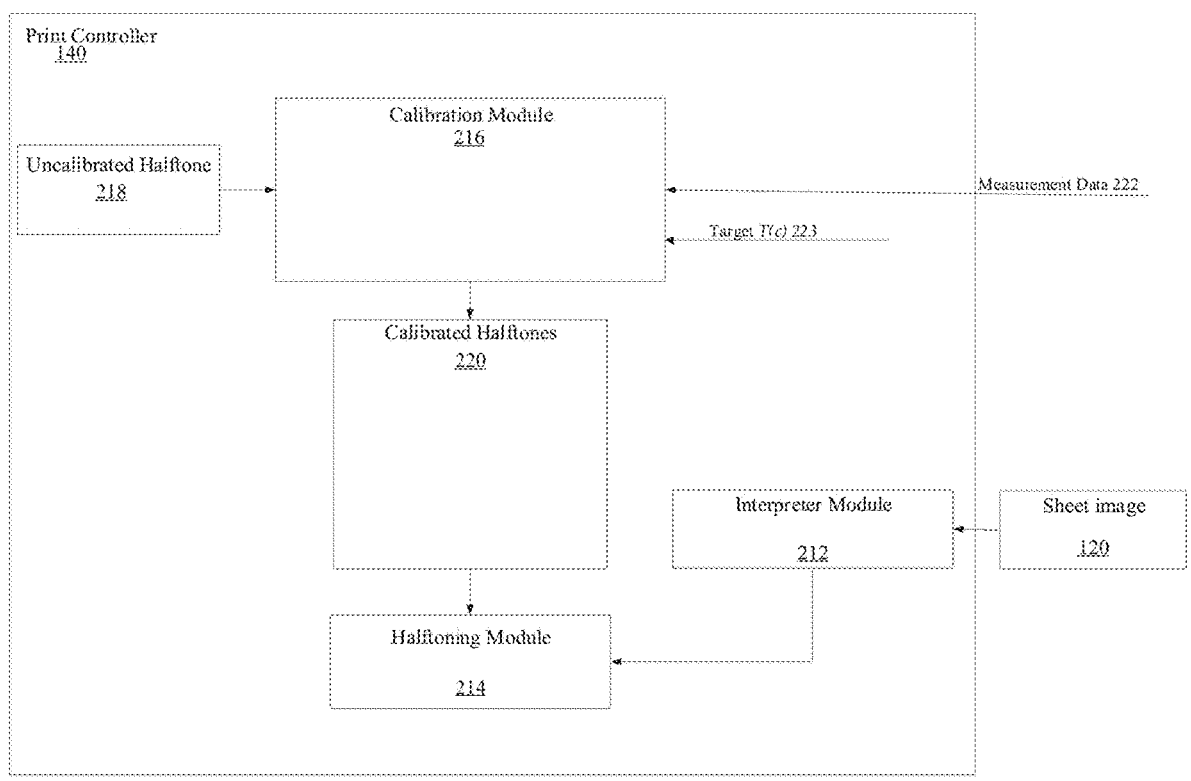
FIG. 2 is a block diagram of one embodiment of a print controller.

FIG. 2 is a block diagram illustrating one embodiment of a print controller 140. The print controller 140, in its generalized form, includes an interpreter module 212, a halftoning module 214, and a calibration module 216. These separate components may represent hardware used to implement the print controller 140. Alternatively, or additionally, the separate components may represent logical blocks implemented by executing software instructions in a processor of the printer controller 140.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 for each primary color are each a 2-dimensional array of pels representing an image of the print job (i.e., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes based on pel location.

In one embodiment, the halftone design may include a finite set of transition thresholds between a finite collection of successively larger drop sizes, beginning with zero and ending with a maximum drop size (e.g., threshold arrays such as single bit threshold arrays or multibit threshold arrays). In another embodiment, the halftone design may include a three-dimensional look-up table with all included gray level values.

In a further embodiment, halftoning module 214 performs the multi-bit halftoning using the halftone design consisting of a set of threshold values for each pel in the sheetside bitmap, where there is one threshold for each non-zero ink drop size. The pel is halftoned with the drop size corresponding to threshold values for that pel. These set of thresholds for a collection of pels is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the pel values in the sheetside bitmap. This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (i.e., a drop size of none where no ink is ejected). Multi-bit halftoning extends the binary threshold array concept to more than one non-zero drop size.

Multi-bit halftoning may use multiple threshold arrays (i.e., multi-bit threshold arrays), one threshold array for each non-zero drop size. The point operation logic is also extended to a set of greater than and less than or equal to operations to determine the drop size by comparing the threshold and image contone data for each pel. Multi-bit defines a power of two set of drop sizes (e.g., two-bit halftone designs have four total drops, including a zero drop size). While power of two may be employed to define the number of drops, systems not following this such as a three total drop system may be used and are still considered multi-bit.

Figure 3:
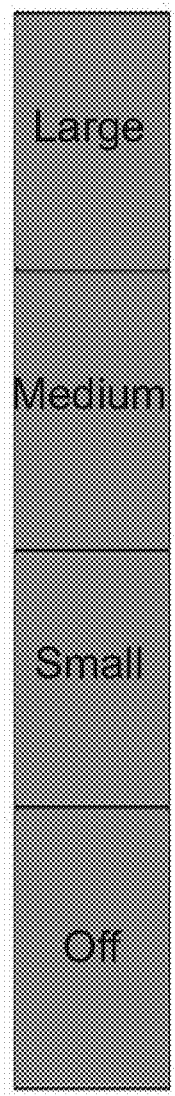
FIG. 3 illustrates one embodiment of multibit halftone designs, where the halftones are described using multi-bit threshold arrays (MTAs)

For multi-bit halftones, as shown in FIG. 3, the MTA is a three-dimensional array including one two-dimensional array for each drop size transition. Thus, an MTA includes a set of two-dimensional arrays of thresholds for transition between drop sizes: plane one provides the threshold for the Large output level, while plane 2 and plane 3 provide thresholds for the Medium and Small output levels respectively for a system having three drop sizes not including zero drop size (none or off). In other embodiments, different one-to-one relationship may be used since the correspondence between plane numbers and drop sizes is arbitrary.

To use these threshold arrays for halftoning, in the case where the threshold arrays are smaller than the sheetside map, each multibit threshold array is tiled across contone image data provided by the sheetside bitmap, which provides a set of threshold values for each pel in the sheetside bitmap. The contone image data (e.g., gray level data) is logically compared to the threshold data on a pel basis. In the case of Large drops, they are produced by the halftoning when the image contone data is greater than the respective large threshold values in plane 1.

Medium drops are produced when the image data is greater than the medium drop plane 2 thresholds and also the image data is less than or equal to the large drop thresholds in plane 1. Small drops are produced when the image data is greater than the small drop thresholds in plane 3 and also the image data is less than or equal to the medium drop thresholds in plane 2.

Finally, the off/none drop size occurs for cases when the contone values is less than or equal to the small drop thresholds in plane 3. In this embodiment of a two-bit multibit printing system, this set of four logical equations, used with thresholds from each plane of the multibit threshold array permit each printing drop size to be defined based on the contone values.

In other embodiments, the number of planes of threshold data can be extended to handle any number of drop sizes. The data from these two-dimensional arrays may be segmented into separate memory regions and stored in any convenient order. For example, the thresholds for each drop size transition may be stored contiguously in memory, and it is often advantageous to do so.

Calibration module 216 performs a calibration process on an un-calibrated halftone 218, or previously generated uniformity compensated halftone, received at print controller 140 to generate one or more calibrated halftones 220. Calibrated halftones 220 are then received at halftoning module 214 along with the sheetside bitmap. In one embodiment, an un-calibrated halftone 218 represents a reference halftone design that is modified to create the calibrated halftones. In such an embodiment, measurements of the system response (e.g., measurement data 222) are received via measurement module 190 using the un-calibrated halftone 218 for printing.

According to one embodiment, calibration module 216 performs an iterative process to achieve uniformity compensation of a calibrated halftone. As used herein, uniformity compensation is defined as a calibration to compensate for measured response differences at a single pel, by a pel forming element 165 (e.g., print head nozzle).

In one embodiment, an un-calibrated halftone 218 is initially received at calibration module 216 and is used to generate a uniformity calibrated halftone. Subsequently, an iterative process is performed that results in a generation of refined uniformity calibrated halftones after each iteration in order to improve uniformity, where each iteration compensates for marking differences of pel forming elements 165. In each case the halftone from the previous iteration is used to print the markings that are measured and used to generate the current uniformity compensation data. In other words, the calibrated halftone created for iteration number two is based on measurements of marks printed using the calibrated halftone from iteration number one.

In a further embodiment, the iterative process is completed once a determination is made that optical density (OD) variations for the pel forming elements 165 for a calibrated halftone are less than a predetermined uniformity threshold associated with a target uniformity compensation specification. The uniformity threshold may be received as an input, or it may be fixed. In yet a further embodiment, a calibrated halftone is saved as a uniformity compensated halftone upon a determination during an iteration that that the OD variations are less than the predetermined threshold.

Figure 4:
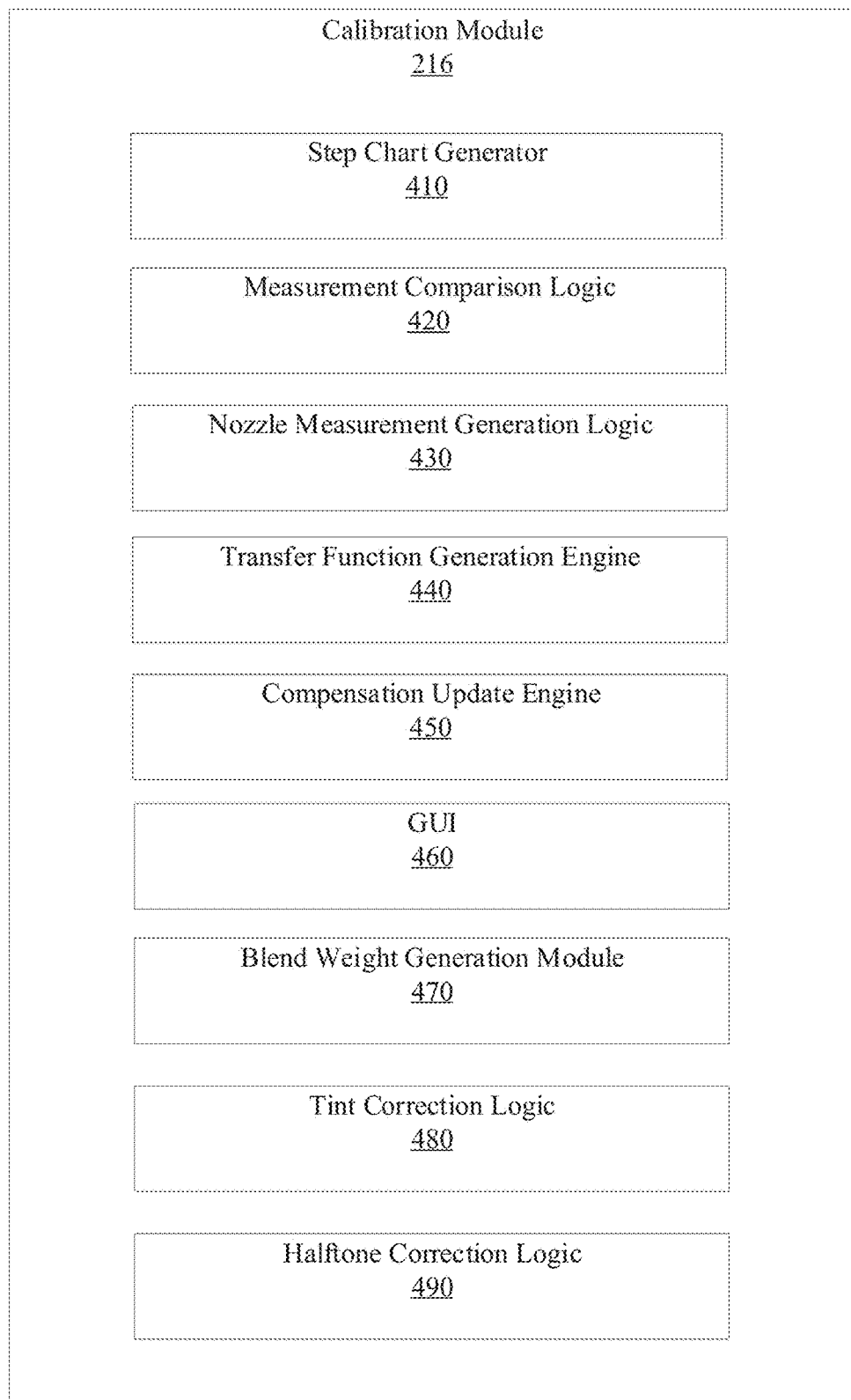
FIG. 4 illustrates one embodiment of calibration module.

FIG. 4 illustrates one embodiment of calibration module 216. As shown in FIG. 4, calibration module 216 includes a step chart generator 410 implemented to print a calibration step chart. In one embodiment, step chart generator 410 generates an initial step chart based on un-calibrated halftone 218. In such an embodiment, the initial step chart uses a threshold array associated with the uncalibrated halftone design to generate the calibration step chart. In subsequent iterations, step chart generator 410 generates a step chart based on a threshold array associated with a current uniformity compensated halftone.

In one embodiment, the calibration step chart is printed by the pel forming elements 165 of printer 160, and an image of the calibration step chart is measured by measurement module 190 (e.g., via a scanner). In such an embodiment, measurement module 190 generates measurement data 222 (e.g., print image measurement data), which includes OD data measured for a uniform grid across the web of the print medium for each pel forming element 165.

The calibration step chart (e.g., test print image) typically includes a number of steps (e.g., bars or stripes) of uniform density in which there may be at least one halftone pattern for each color of ink used by the printer. The stripe densities range from paper white (no ink) to maximum density for each ink color. Enough intermediate densities are included to allow interpolation to accurately recover the average measured density corresponding to each color value by interpolation. The steps or bars are arranged so that every segment or portion of the print head prints every color and shade of every color of ink at some point in the chart pattern. Enough pixels are included in the height of the bar so that the random variations in the halftone design are averaged away by averaging measured densities over the bar height. In one embodiment, there is one row in each bar for each row in the halftone threshold array, so that each bar constitutes a complete sample of the halftone design's threshold distribution, and there is no sampling noise included in the measurement due to halftoning of the step chart before printing.

Calibration module 216 also includes Measurement comparison logic 420 to receive the measurement data 222 (e.g., OD data or perceptual lightness L* data) and determine whether the measurement data 222 (e.g., OD) variations for the pel forming elements 165 are less than a predetermined threshold associated with the target uniformity compensation specification. OD variations are differences in the average measured OD values of the printing resulting from one print head nozzle (e.g., pixel) versus measured OD values from one or more other nozzles in response to the same color value input being printed.

Perceptual lightness (L*) variations may be determine based on Delta E. The uniformity compensation specification comprises a maximum allowable value for these differences or to limits on statistics related to the distribution of differences, such as limits on the mean and standard deviation of the differences. The statistics may include a weighting factor for the OD values wherein the weighting factor is higher for other nozzles that are closer to the one nozzle than other nozzles farther away. In one embodiment, the predetermined threshold is received at calibration module 216 from a system user via a graphical user interface (GUI) 460.

Upon a determination that the variations are less than the pre-determined threshold, Measurement comparison logic 420 transmits a message indicating that a uniformity compensated halftone has been achieved (e.g., the OD variations are less than the pre-determined threshold). In one embodiment, the message may comprise the uniformity compensated halftone, including threshold values associated with each of the pel forming elements 165. Upon a determination that the variations are greater than the pre-determined threshold, nozzle measurement generation logic 430 generates measurement data associated with each of the pel forming elements 165 (e.g., nozzle measurement data). In this embodiment, the nozzle measurement data comprises an interpolation of the measured OD data. In another embodiment, upon a determination that the OD variations are greater than the pre-determined threshold, Measurement comparison logic 420 transmits a message indicating that a uniformity compensated halftone has not been achieved (e.g., the OD variations are greater than the pre-determined threshold). Printing System 130 or Print Controller 140 may initiate the generation and printing of a revised calibration step chart upon receiving the message.

Transfer function generation engine 440 generates a transfer function and/or an inverse transfer function (ITF) for each of the pel forming elements 165 based on the measured OD data and a received uniformity compensation target function. In one embodiment, a transfer function comprises a mapping of an input digital count to an output digital count for a system, where digital count is the gray level or color value representing the pels in a bitmap 150 (FIG. 1). Transfer functions may be received or generated (e.g., generated based on target OD versus input digital count data and measured OD versus output digital count data).

An inverse transfer function is the reversed (e.g., inverted) application of the transfer function, where the output digital count values of the transfer function form the input digital count values of the inverse transfer function and the input digital count values of the transfer function form the output digital count values of the inverse transfer function.

Figure 5:
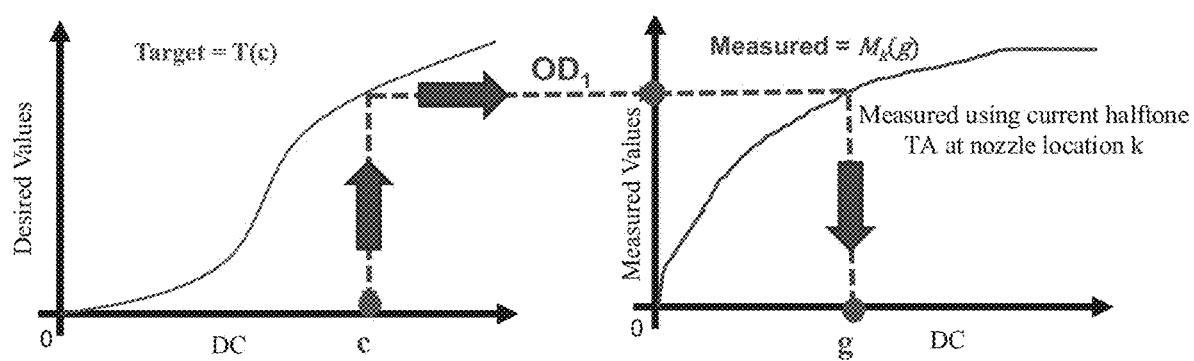
FIG. 5 illustrates one embodiment of a transfer function for a nozzle location.

FIG. 5 illustrates one embodiment of a transfer function of a nozzle formed by the set of (c, g) tuples for all digital count levels. As shown in FIG. 5, the inverse transfer function of a pel forming element (e.g., nozzle) is represented as $U_k(g)=c=TF_k^{-1}(g)$. Alternately, the inverse transfer functions for all nozzle locations k can be computed directly using $T^{-1}(M_k(g))$. Target OD response T(c) 223 is used as a uniformity objective for all nozzles for a current halftone. The measured response for nozzle position k is given by $M_k(g)$. The measured response is determined by printing a single color. The target is the desired response for the color (e.g., primary color). Where $\{h_{kl}\}_i$ is the three-dimensional Threshold Array for ith iteration, column location k and drop size level l. The Threshold Array includes threshold for all drop sizes. Thresholds for column k are used in the halftoning process to print using nozzle k. Therefore, there is a one-to-one correspondence between nozzles from the ink jet array to columns of the threshold array, assuming the uniformity compensation threshold array is the same width as the printhead nozzle array. The rows of the threshold array are not included for simplicity. The curly brackets are used to indicate sets of threshold values. It should be understood that the entire threshold array is three dimensional, with rows in the web movement direction, columns corresponding to each nozzle and planes corresponding to each nonzero drop size. Further, it should be understood that a different threshold array $h_{kl}$ exists for each primary color. Separate indices for each one of the different colors are omitted for simplicity.

In one embodiment, the same color target is used for all nozzles to achieve uniform printing. $U_k$ represents the inverse transfer function for nozzle k, which maps color value g to color value c in FIG. 5. $U_k$ may be determined as shown in FIG. 5 by following the dotted line path in the opposite direction of the indicated arrows. In one embodiment, the color values are the Digital Count (DC) levels, which are 0 to 255, for a typical 8-bit printing system. Threshold values, represented by their g values, are transformed to new threshold values for all nozzles k using the inverse transfer functions derived for nozzle k; where the target remains the same for each nozzle k and the measured response changes for each nozzle k.

In such an embodiment, the inverse transfer function of a color value g is the color value c, whose target value T(c) is the measured value $M_k(g)$ that results when the color value g is printed. T(c) may be set the same for all nozzles to provide uniformity between all nozzles. The value $M_k(g)$ is the measured OD at the cross print medium (e.g., web)

location corresponding to nozzle k and the current halftone (e.g., threshold array). $U_k$ may be computed directly, rather than by inverting a TF, starting from $M_k(g)$, and then finding $T^{-1}(M_k(g))$. The inverse of the target function $T^{-1}$ may be found by tabulating the target function in two columns having all c and g values, and subsequently swapping the columns. The measured response $M_k(g)$ at nozzle location k may be measured with the entire Threshold Array employed for printing, so as to include contributions from adjacent compensated nozzles. Employing scanned image data, the data is interpolated to obtain the measured response for the nozzle at location k.

As shown in FIG. 5, the Transfer Function TF(c)=g. In one embodiment, the transfer function of color value c is a color value g that, when color value g is printed by the print system, causes the target optical density at color value c to be obtained as the measured value. $TF_k(c)$ may be determined as shown in FIG. 5 by following the dotted line path in the direction of the indicated arrows. This is because c and g both have the same Optical Density $OD_1$ associated with them. Color c occurring in the target domain and color g in the measured domain systems.

The TF(c) may be derived from T(c) and $M_k(g)$ by tabulating the matching color pairs for optical densities as explained here for colors c and g. $U_k$ may then be determined by inverting $TF_k$. Alternately the target and measured functions can be treated as continuous functions with the transfer function $TF_k(c)$ and $TF_k^{-1}(g)$ derived from the continuous function relationships, previously provided. The target value T(c) and measured response value $M_k(g)$ may correspond to the same color as the color of nozzle k (e.g., one of a plurality of primary colors). As will be explained below, the target value T(c) 223 and measured response value $M_k(g)$ may alternatively correspond to a secondary or tertiary color (e.g., a combination of primary colors) that includes the color contribution of the nozzle k (e.g., one of a plurality of primary colors). The methods of calculating $TF_k(c)$ and $TF_k^{-1}(g)$ apply in either case.

Once the inverse transfer functions have been generated, compensation update engine 450 generates an updated uniformity compensated halftone by modifying all the thresholds in each column of the threshold array of the current halftone using the generated inverse transfer function for each respective nozzle. In one embodiment, the inverse transfer function for each column (or nozzle) (k) is used at each iteration to transform the current threshold values $\{h_{kl}\}_{i-1}$ of the compensated halftone from the previous iteration. This creates threshold values for the compensated halftone, $\{h_{kl}\}_i$. This process generates thresholds in the compensated threshold array, based on the corresponding thresholds from the current threshold array.

According to one embodiment, each threshold of the compensated threshold array is determined by using the transformation defined by the corresponding ITF applied to each threshold for all corresponding pels and drop sizes. If the ITF is assumed to be a continuous function, threshold values after transformation may be rounded to integer threshold values. The domain of threshold values in the Threshold Arrays created for printing must match the bit depth of image data in the imaging path.

Creating uniformity compensated halftones are preferably generated at a higher bitdepth, which is greater than the bitdepth for the imaging path. In the case where the halftone bitdepth is higher than the bitdepth of the imaging path, downsampling the halftones or bit shifting the image data to match the halftone thresholds is required to obtain the same bitdepths between the halftone and imaging path. The downsampling process should preserve the patterns in the higher bitdepth halftone instead of creating new thresholds by bit truncation of the least significant bits of the halftone thresholds.

For example, each drop size (l) of a multi-level halftone has a corresponding set of thresholds, where level l=0 represents the pattern of small drops, assuming a halftone having for example small, medium, and large drops. Such a halftone has three levels {0,1,2}. A set of thresholds is not required for the none drop case since, this is logically related to the small thresholds. In a web wide halftone, each nozzle/column k of a print head has a set of halftone thresholds for each level l of the multilevel halftone, $\{h_{k,l}\}$. After iteration (i) the uniformity compensated halftone threshold array is: $\{h_{k,l}\}_i = U_{k,i}(U_{k,i-1}( \ldots U_{k,1}(\{h_{kl}\}_0) \ldots ))$, where $U_{k,i}$ is the inverse transfer function for nozzle k at iteration i. The uncalibrated initial halftone threshold array is given by $\{h_{kl}\}_0$. This results in convergence towards uniform response in the halftoned image.

In an alternative embodiment, transfer functions may be implemented to apply directly to image data. In this case the uncalibrated halftone is not modified. Instead, the image data is transformed prior to halftoning. In this embodiment, transfer function generation engine 440 generates a transfer function for each nozzle, rather than inverse transfer functions, while compensation update engine 450 modifies the transfer function for each nozzle, by applying the current transfer function to it, to generate the current cumulative transfer function. Where the cumulative transfer function is obtained by cascading transfer functions from each iteration. It is important to distinguish between the cumulative transfer function determined in this way:

$$TFC_i(c) = TF_i(TF_{i-1}( \ldots TF_1(c) \ldots ))$$

from the current transfer function at iteration i, $TF_i(c)$. The cumulative transfer function is, in other words, the cascaded composition of transfer functions determined by measurements at each iteration, i. Additionally, this embodiment includes step chart generator 410 generating a calibration step chart using the halftone (e.g., threshold array) and/or transfer function. In the case of transfer functions, they are applied to modify the image data when printing.

In one embodiment, the uncalibrated halftone is employed for printing in this embodiment and only the cumulative transfer function is recomputed to obtain the current cumulative transfer function after iteration i. Assuming the cumulative transfer function is $TFC_{k,i}$ for nozzle k after iteration i, the current cumulative transfer function for all nozzles is $$TFC_{k,i} = TF_{k,i}(TF_{k,i-1}( \ldots (TF_{k,1}) \ldots )),$$

where $TF_{k,i}$ is the transfer function for nozzle k, as measured after iteration i. An initial transfer function $TF_{k,0}$ is used, which typically is the identity transfer function. In another embodiment an initial transfer function derived based on engine calibration might be used. This results in convergence towards uniform response in the uniformity compensated image, employing cascaded transfer functions instead of uniformity compensated halftones.

Figure 6:
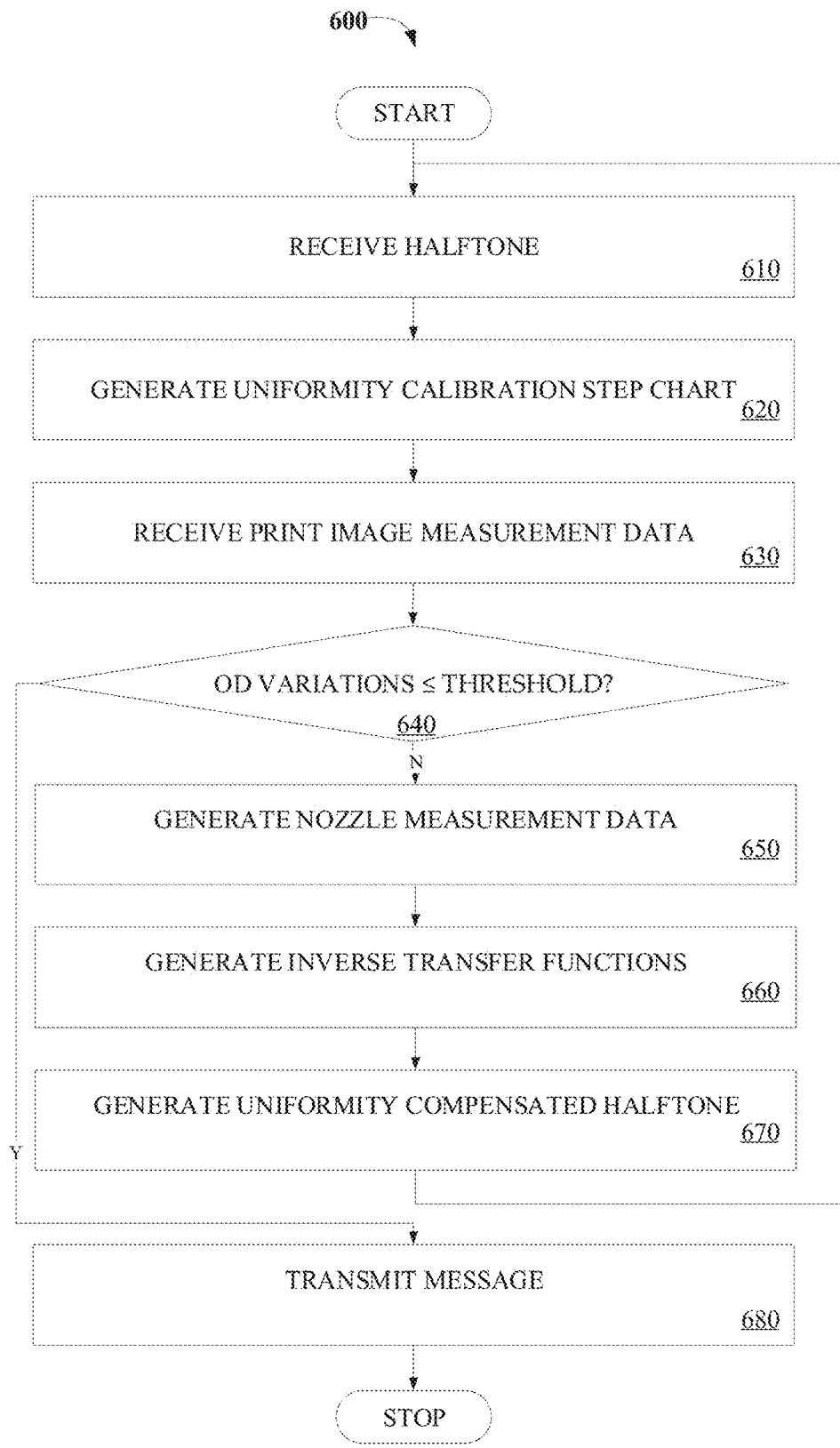
FIG. 6 is a flow diagram illustrating one embodiment of a uniformity compensation process performed by a printing system.

FIG. 6 is a flow diagram illustrating one embodiment of a process 600 for performing uniformity compensation. Process 600 may be performed by processing logic that may include hardware (e.g., circuitry, dedicated logic, programmable logic, microcode, etc.), software such as instructions run on a processing device, or a combination thereof. In one embodiment, process 600 is performed by calibration module 216.

At processing block 610, a halftone is received. In the first iteration of the process, the halftone is an uncalibrated halftone. At processing block 620, a uniformity calibration step chart is generated. OD values, when uniformity compensated, will ideally be the same for all nozzle locations k for a single tint level in the chart. This chart may have cross web stripes having the same tint level, ranging from zero to 100% in multiple steps. At processing block 630, the uniformity calibration chart is printed and print image measurement data from measuring the chart, including the OD measurement data, is received. At decision block 640, a determination is made as to whether OD variations are less than or equal to the predetermined threshold. If so, a message is transmitted indicating that a uniformity compensated halftone has been achieved, processing block 680. As discussed above, the message may include uniformity compensated halftone values. In some embodiments, a message may also be transmitted indicating that the variations are greater than the pre-determined value (e.g., indicating that another iteration is to be performed).

At processing block 650, nozzle measurement data is generated upon a determination that the OD variations are greater than the predetermined threshold. As discussed above, the nozzle measurement data may be generated by interpolating the OD measurement data. At processing block 660, inverse transfer functions are generated for each nozzle to achieve the target OD response for each nozzle.

At processing block 670, a uniformity compensated halftone is generated by modifying the thresholds in each column of the threshold array using the inverse transfer function for each nozzle. By performing these steps on a per nozzle basis, improved uniformity compensation (e.g., more accurate, faster, less operator burden, etc.) over conventional methods may be achieved. In one embodiment, a uniformity compensated halftone is generated for each drop size of the halftone design, which produces the current threshold array which is employed for printing or printing the uniformity calibration step chart. In another embodiment, at processing block 670, the uniformity compensated halftone for each of the pel forming elements is transmitted. In yet another embodiment, at processing block 670 a message is transmitted indicating that the uniformity compensated halftone has not been achieved (e.g., request revised print image measurement data corresponding to printing a revised uniformity calibration step chart with the revised uniformity compensated halftones).

Subsequently, control is returned to processing block 610, where the uniformity compensated halftone is received as an updated halftone. This loop is repeated for as many iterations that are needed to satisfy the condition of decision block 640. When a threshold array is generated which satisfies the OD variation criteria it may be used for all subsequent printing. The uniformity compensated threshold arrays may be saved with the current conditions, such as the paper type. Subsequent printing, using the same paper type, may employ the saved uniformity compensated threshold array.

Figure 7:
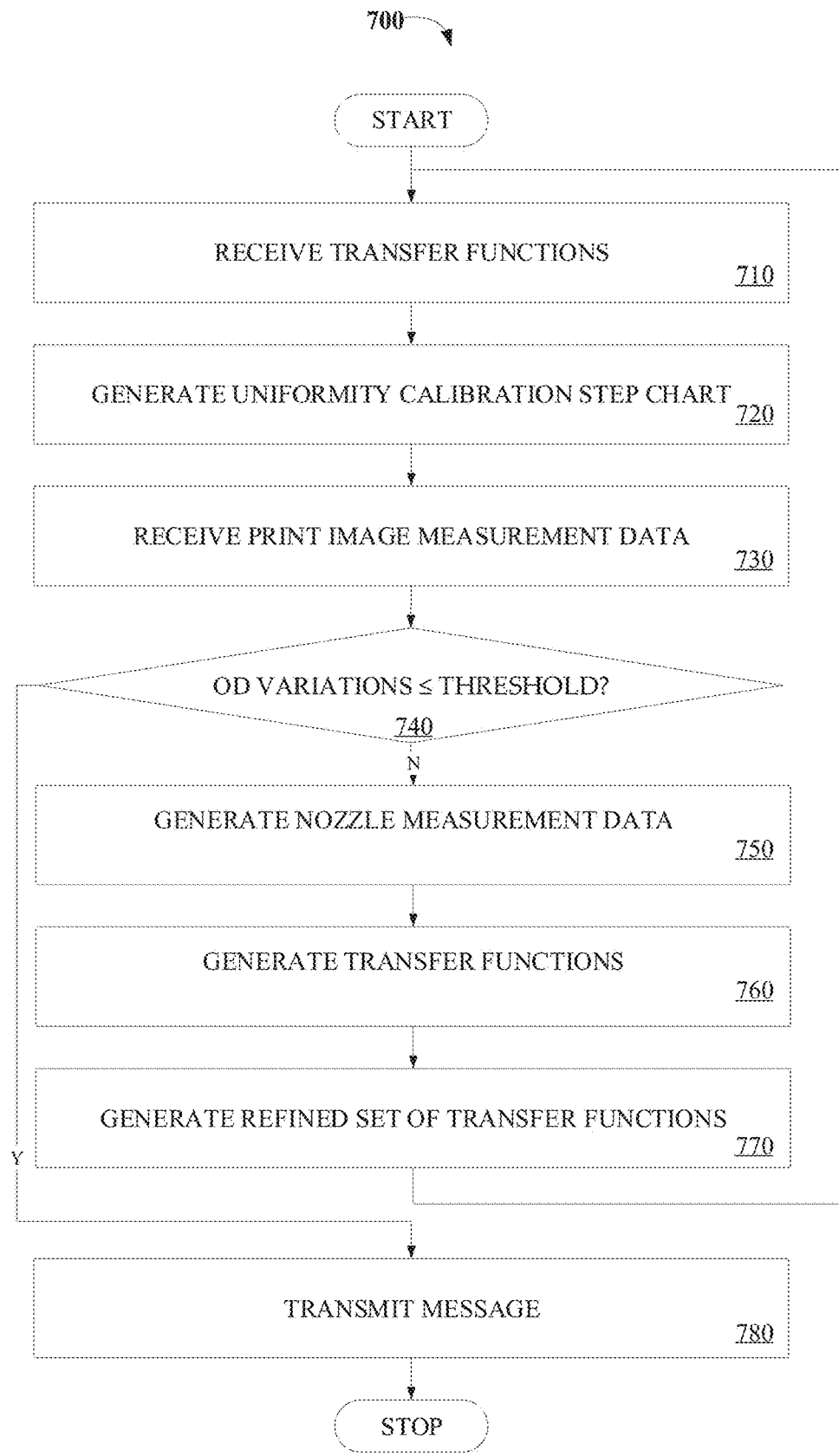
FIG. 7 is a flow diagram illustrating another embodiment of a uniformity compensation process performed by a printing system.

FIG. 7 is a flow diagram illustrating another process 700 for performing uniformity compensation. In this process transfer functions for each nozzle based on a cascaded process are employed. Process 700 may be performed by processing logic that may include hardware (e.g., circuitry, dedicated logic, programmable logic, microcode, etc.), software such as instructions run on a processing device, or a combination thereof. In one embodiment, process 700 is performed by calibration module 216.

At processing block 710, transfer functions for the nozzles are received. At processing block 720, a uniformity calibration step chart is generated. At processing block 730, the uniformity calibration chart is printed employing the current set of uniformity transfer functions for each nozzle, and print image measurement data from measuring the chart, including the OD measurement data, is received. During the first iteration of this process, prior to the determination of the first set of uniformity transfer functions, the transfer function for each nozzle is set to identity where output levels equal the input levels. At decision block 740, a determination is made as to whether OD variations are less than or equal to the predetermined threshold. If so, a message is transmitted indicating that a uniformity compensated set of transfer functions has been obtained, processing block 780.

Nozzle measurement data is generated upon a determination that the OD variations are greater than the predetermined threshold, processing block 750. At processing block 760, transfer functions are generated for each nozzle. At processing block 770, a refined set of cumulative transfer functions (cascaded transfer functions) are generated by modifying the previous transfer function sets for all nozzles. In another embodiment, the refined set of cumulative transfer functions are transmitted. Subsequently, control is returned to processing block 710, where the process is repeated. Once a refined set of cumulative transfer functions has been generated that satisfies the OD variation criteria, the cumulative transfer functions may be used for all subsequent printing. The uniformity compensated set of cumulative transfer functions may be saved with the current conditions, such as the paper type. Subsequent printing, using the same paper type, may utilize the saved sets of refined cumulative transfer functions.

Note that the cascaded refined cumulative transfer function approach described may be employed in printing systems that do not have point operation halftoning, using threshold arrays. The described uniformity system, employing a refined set of cascaded transfer functions, can be employed in printers having neighborhood halftoning implemented, such as error diffusion. In this case when using neighborhood operation halftoning, the halftoning function is replaced with an algorithmic approach instead of using a point operation halftone method.

Secondary Color Uniformity Compensation

Calibration module 216 is implemented to perform the above-described iterative uniformity compensation processes for each primary ink color (e.g., CMYK) to minimize residual non-conformity arising from nozzle interactions and print head misalignments. However, overlapping inks of different colors forming secondary color areas produce further interactions that that need to be corrected. In fact, print system users may be more concerned with secondary color uniformity than primary color uniformity.

According to one embodiment, calibration module 216 may also perform uniformity compensation for secondary colors (e.g., Red, Green and Blue (RGB) colors). In such an embodiment, uniformity compensation is performed for each secondary color, which is comprised of two colors blended according to a prescribed pair of primary color values at each tint. As used herein, a color is defined as a unique combination of primary ink tints, while a tint is defined as an areal density of a primary ink.

In a further embodiment, the above-described iterative uniformity compensation process is implemented such that print image measurement data derived from step charts associated with each secondary color are employed to obtain uniformity compensation for the primary colors corresponding to the secondary colors. For example, uniformity compensation is performed for a first secondary color (e.g., red) based on measurements derived from a red step chart using an equal mixture of first and second primary colors (e.g., yellow and magenta).

Subsequently, uniformity compensation is performed for a second secondary color (e.g., green) based on measurements derived from a green step chart using an equal mixture of first and a third primary colors (e.g., yellow and cyan). Further, uniformity compensation is performed for a third secondary color (e.g., blue) based on measurements derived from a blue step chart using an equal mixture of the second and third primary colors (e.g., magenta and cyan). This process is repeated until a convergence occurs (e.g., OD variations for each secondary color are less than or equal to a predetermined uniformity specification threshold), as will be discussed in further detail below.

In further embodiments, secondary color uniformity compensation may be performed using uniformity compensation data (e.g., uniformity compensated halftones or transfer functions) received for the primary colors generated via the iterative uniformity compensation process discussed above with reference to FIGS. 6 and 7. In such embodiments, the primary color uniformity compensation data may be retrieved (e.g., from storage). However in other embodiments, secondary color uniformity compensation may be performed without the uniformity compensated primary colors.

In one embodiment, calibration module 216 performs uniformity compensation of secondary colors using halftone designs (or halftones). As discussed above, a uniformity compensated halftone is generated by applying an inverse transfer function corresponding to the pel forming element to a halftone associated with the pel forming element. In a further embodiment, performing uniformity compensation of secondary colors comprises generating uniformity compensated halftones for the primary colors from which the secondary colors (e.g., red, green and blue) are comprised based on inverse transforms corresponding to the respective secondary colors.

For example, uniformity compensation is performed for the color red to generate a uniformity compensated halftone for each pel forming element associated with the primary color yellow, and generate a uniformity compensated halftone for each pel forming element associated with the primary color magenta, based on an inverse transfer function corresponding to the color red.

Uniformity compensation is performed for the color green by generating an updated uniformity compensated halftone for each pel forming element associated with the primary color yellow and generating a uniformity compensated halftone for each pel forming element associated with the primary color cyan based on an inverse transfer function corresponding to the color green. In one embodiment, the updated compensated halftone for the color yellow is generated by modifying the yellow compensated halftone generated for the color red using the yellow compensated halftone generated for the color green.

Further, uniformity compensation is performed for the color blue by generating an updated compensated halftone design for each pel forming associated with the primary color cyan and generating an updated uniformity compensated halftone design for each pel forming associated with the primary color magenta based on an inverse transfer function corresponding to the color blue. In one embodiment, the updated compensated halftone for the color cyan is generated by modifying the cyan compensated halftone generated for the color green using the cyan compensated halftone generated for the color blue, while the updated compensated halftone for the color magenta is generated by modifying the magenta compensated halftone generated for the color red using the magenta compensated halftone generated for the color blue.

Although described herein with reference to CMYK, other embodiments may perform secondary color uniformity compensation for different color schemes, such as the Extended Color Gamut CMYKOGV and hexachrome CMYKOG.

Once the updated halftone designs for the primary colors have been generated, a determination is made as to whether measurement variations (e.g., OD variations) for each secondary color is less than a predetermined uniformity specification threshold. In one embodiment, calibration module 216 transmits the uniformity compensated halftones upon a determination that the variation in optical density data for pel forming elements associated with each of the plurality of secondary colors is less than or equal to the predetermined threshold. Otherwise, a subsequent pass of uniformity compensation of secondary colors is performed.

In one embodiment, calibration module 216 generates updated uniformity compensated halftones for the yellow, magenta and cyan primary colors in the subsequent pass using the uniformity compensated halftones generated in the previous pass. In this embodiment, calibration module 216 repeats the process for subsequent passes until a determination that the OD variations are less than or equal to the predetermined threshold.

Figure 8:
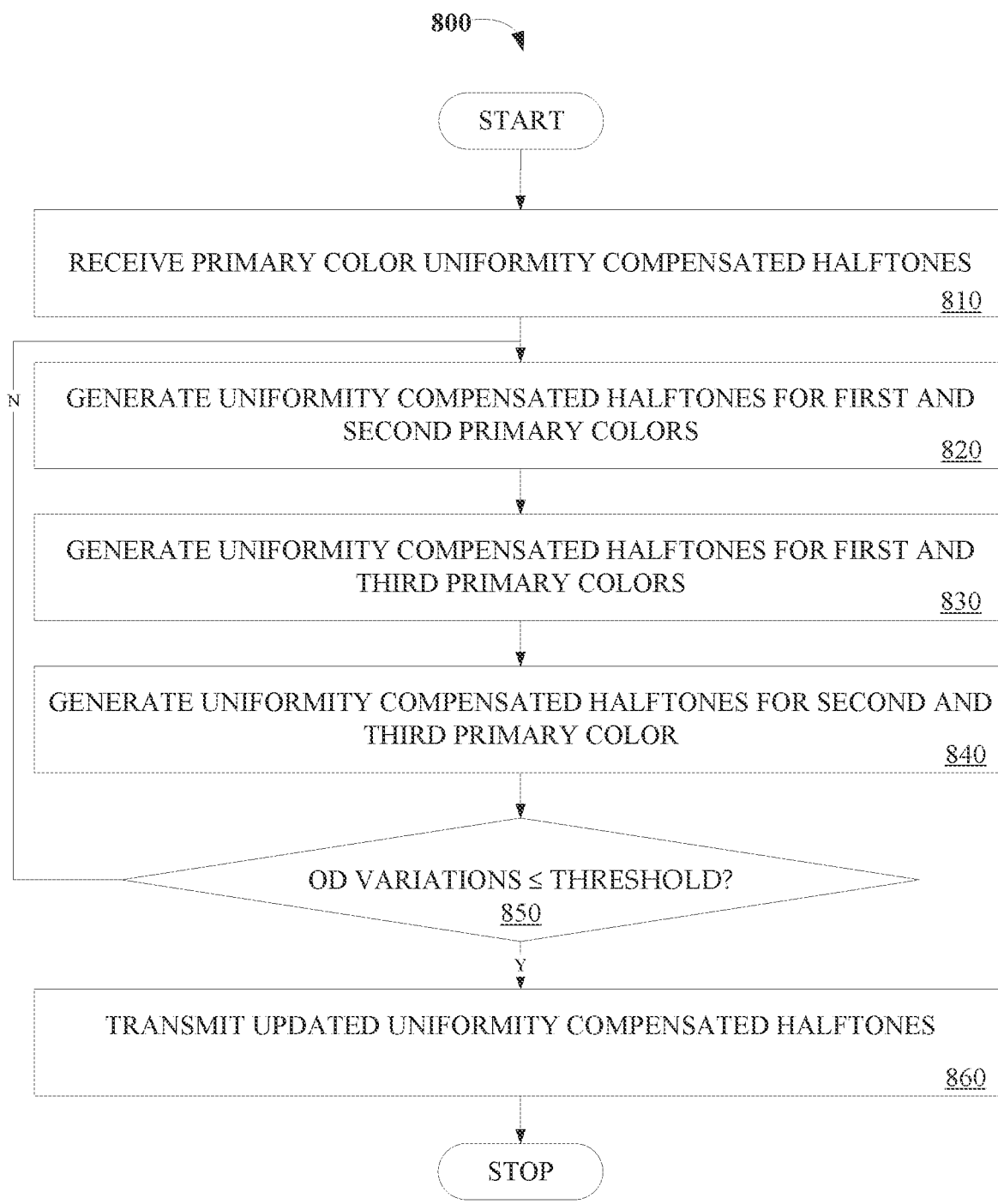
FIG. 8 illustrates one embodiment of a secondary color uniformity compensation process performed by a printing system.

FIG. 8 is a flow diagram illustrating another process 800 for performing uniformity compensation for secondary colors. Process 800 may be performed by processing logic that may include hardware (e.g., circuitry, dedicated logic, programmable logic, microcode, etc.), software such as instructions run on a processing device, or a combination thereof. In one embodiment, process 800 is performed by calibration module 216.

At processing block 810, uniformity compensated halftones are received for each primary color. At processing block 820, uniformity compensation is performed for a first secondary color (e.g., red) by generating compensated halftones for each pel forming element associated with a first primary color (e.g., yellow) and a second primary color (e.g., magenta) based on an inverse transfer function corresponding to the first secondary color.

At processing block 830, uniformity compensation is performed for a second secondary color (e.g., green) by generating an updated compensated halftone for each pel forming element associated with the first primary color and generating a compensated halftone for each pel forming element associated with a third primary color (e.g., cyan) based on an inverse transfer function corresponding to the second secondary color. The compensated first primary color halftone generated from block 820 is used in this generation process for the second secondary color compensation.

At processing block 840, uniformity compensation is performed for a third secondary color (e.g., blue) by generating updated compensated halftones for each pel forming element associated with the second primary color and the third primary color based on an inverse transfer function corresponding to the third secondary color. The compensated third primary color halftone generated from processing block 830 is used in this generation process for the third secondary color compensation.

According to one embodiment, processing blocks 820-840 are each performed according to a process like discussed above with reference to FIG. 6. The print image measurement data, threshold data and target data in this case are for the secondary colors for which the compensation is being done. This will generate two compensated halftones (e.g., one compensated halftone for each of the corresponding primary colors).

At decision block 850, a determination is made as to whether OD variations associated with the secondary color (e.g., received in print image measurement data 222, as shown in FIG. 6) is less than or equal to the predetermined threshold. If so, the updated uniformity compensated halftones are transmitted, processing block 860. However, control is returned to processing block 820, where the process is repeated using the updated uniformity compensated halftones upon a determination that the secondary color OD variations are greater than the predetermined threshold. As discussed above, some embodiments may be performed without receiving uniformity compensated halftones associated with the primary colors. In such embodiments, processing block 810 may be omitted, instead uncalibrated halftones for the first, second and third primary colors are employed in the process.

In an alternative embodiment, calibration module 216 performs uniformity compensation of secondary colors using transfer functions. In this embodiment, transfer functions are generated for the primary colors from which the secondary colors are comprised. For instance, uniformity compensation is performed for the color red by generating transfer functions for each pel forming element associated with the primary color yellow and each pel forming element associated with the primary color magenta.

Uniformity compensation is subsequently performed for the color green by generating an updated uniformity transfer function for each pel forming element associated with the primary color yellow and generating a transfer function for each pel forming element associated with the primary color cyan. In one embodiment, updated uniformity transfer functions are generated by modifying (or combining) transfer functions via a cascading process, where the output of one transfer function forms the input of a second cascaded function. Thus, the updated transfer function for the first primary color is generated by using the output of the yellow transfer function generated for the color red as the input to the yellow transfer function generated for the color green.

Additionally, uniformity compensation is performed for the color blue by generating updated transfer functions for each pel forming associated with the primary color cyan and each pel forming associated with the primary color magenta. In one embodiment, the updated transfer function for the second primary color is generated by modifying the cyan transfer function generated for the color green using the cyan transfer function generated for the color blue, while the updated transfer function for the third primary color is generated by modifying the magenta transfer function generated for the color red using the magenta transfer function generated for the color blue. In this embodiment, calibration module 216 also repeats the process for subsequent passes until a determination that the secondary color OD variations are less than or equal to the predetermined threshold.

Figure 9:
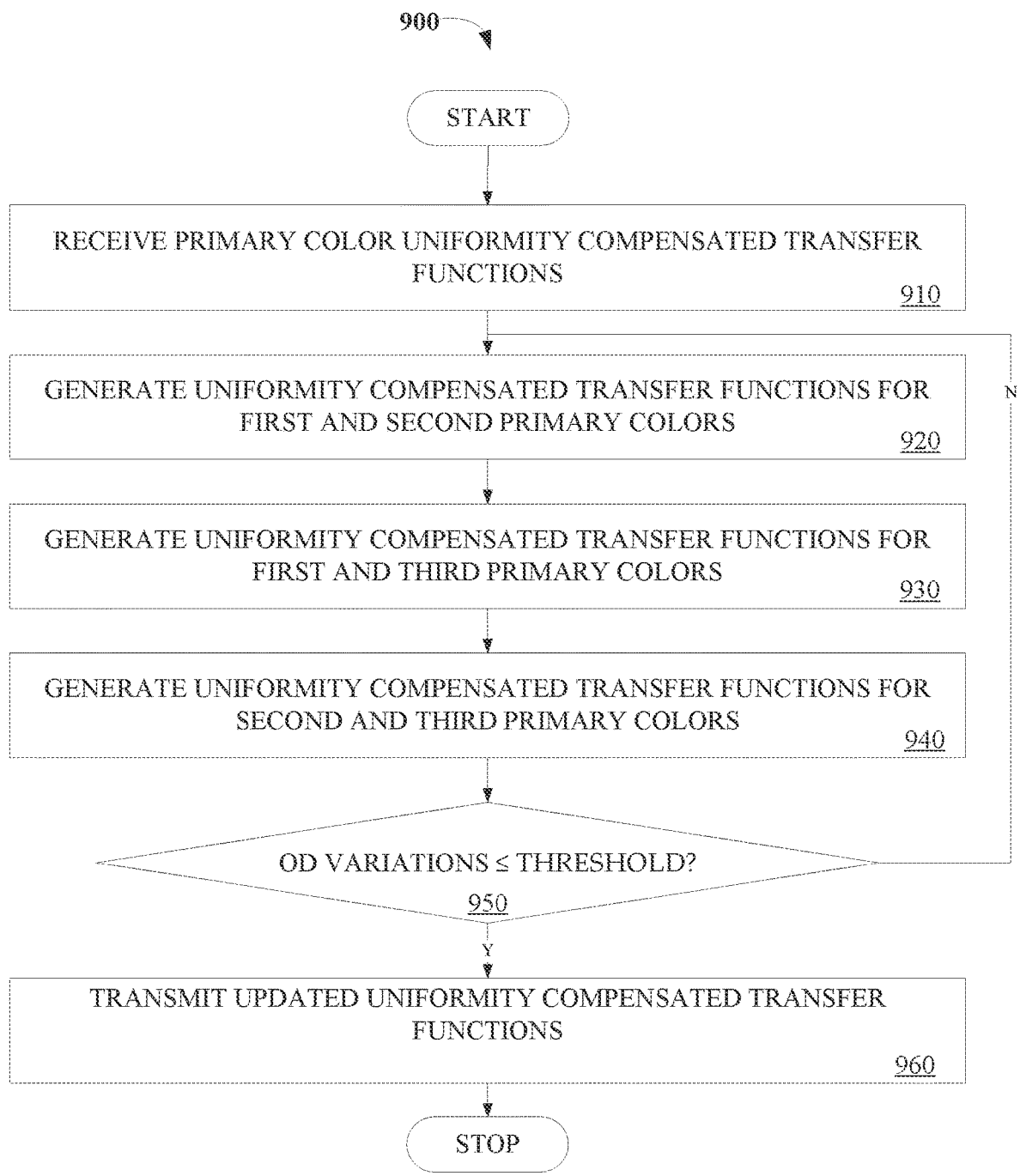
FIG. 9 illustrates another embodiment of a secondary color uniformity compensation process performed by a printing system.

FIG. 9 is a flow diagram illustrating another process 900 for performing uniformity compensation for secondary colors. Process 900 may be performed by processing logic that may include hardware (e.g., circuitry, dedicated logic, programmable logic, microcode, etc.), software such as instructions run on a processing device, or a combination thereof. In one embodiment, process 900 is performed by calibration module 216.

At processing block 910, uniformity compensated transfer functions are received for each primary color. At processing block 920, uniformity compensation is performed for a first secondary color (e.g., red) by generating transfer functions for each pel forming element associated with a first primary color (e.g., yellow) and a second primary color (e.g., magenta). At processing block 930, uniformity compensation is performed for a second secondary color (e.g., green) by generating an updated compensated transfer function for each pel forming element associated with the first primary color and generating a compensated transfer function for each pel forming element associated with a third primary color (e.g., cyan).

At processing block 940, uniformity compensation is performed for a third secondary color (e.g., blue) by generating updated compensated transfer functions for each pel forming element associated with the second primary color and the third primary color. In one embodiment, processing blocks 920-940 are each performed according to a process similar to discussed above with reference to FIG. 7. The print image measurement data, threshold data and target data in this case are for the secondary colors for which the compensation is being done.

At decision block 950, a determination is made as to whether the secondary color OD variations are less than or equal to the predetermined threshold. If so, the updated transfer functions are transmitted, processing block 960. If not, control is returned to processing block 920, where the process is repeated using the updated uniformity compensated transfer functions. At processing bock 910 a set of identity transfer functions, having output values equal to input values, may be used for the initial set of transfer functions. In a further embodiment, engine calibration transfer functions for each primary color may be employed. In this embodiment a set of uniformity compensated transfer functions, which includes engine calibration, will be obtained. According to one embodiment, uniformity compensation may also be performed for tertiary colors, such as CMY neutral. In such an embodiment, uniformity compensation of neutral colors (e.g., grayscale plus 7 (G7)) is performed using a mixture of cyan, magenta and yellow. In a further embodiment, the OD measurement data is analyzed by calibration module 216 to determine the uniformity of the G7 mixture. Based on the mixture uniformity, a transfer function or halftone design is generated for pel forming elements associated with cyan, magenta and yellow. This process is repeated until OD variations are less than the predetermined threshold.

Figure 10:
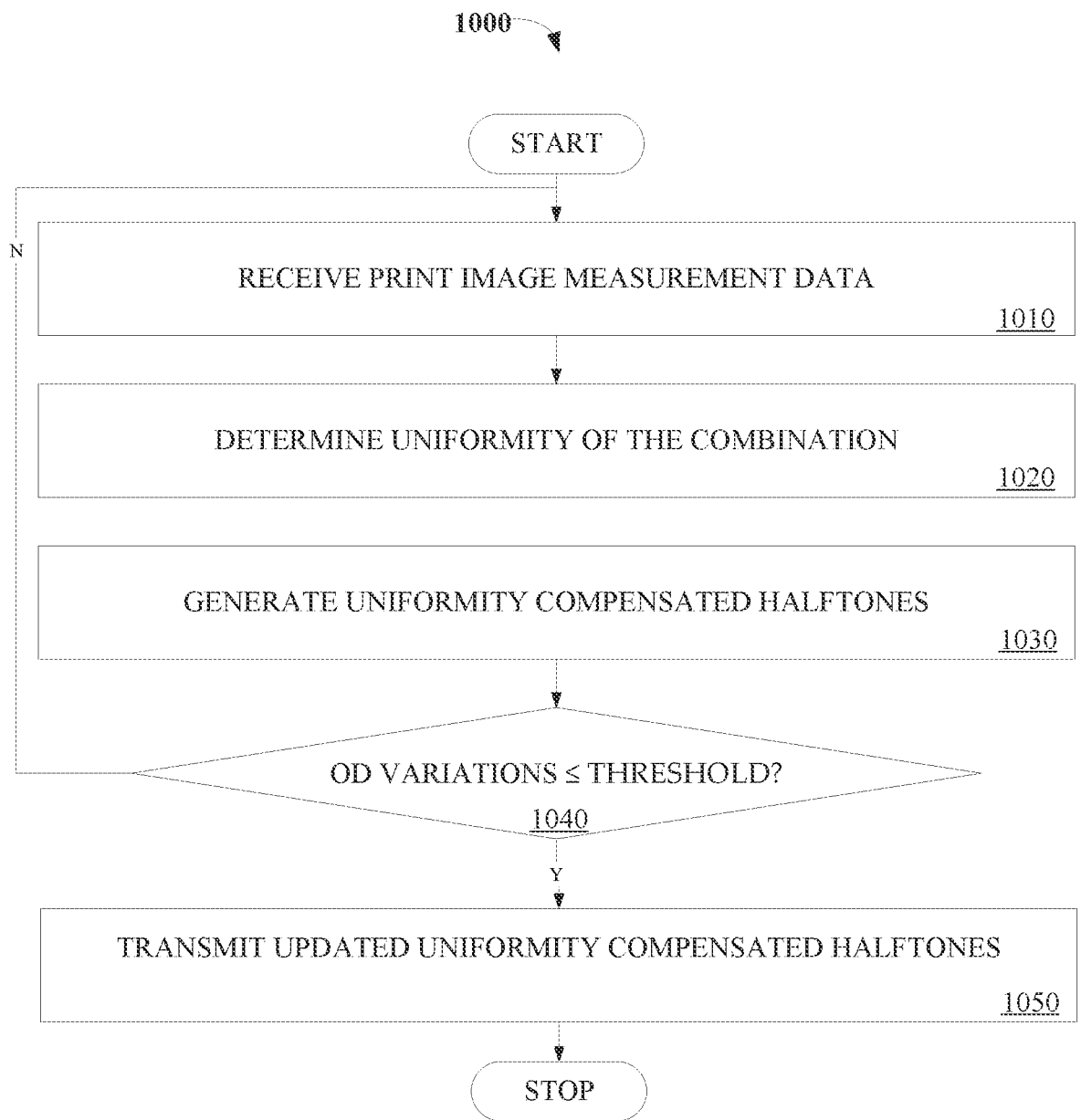
FIG. 10 illustrates one embodiment of a tertiary color uniformity compensation process performed by a printing system.

FIG. 10 is a flow diagram illustrating a process 1000 for performing uniformity compensation for tertiary colors. Process 1000 may be performed by processing logic that may include hardware (e.g., circuitry, dedicated logic, programmable logic, microcode, etc.), software such as instructions run on a processing device, or a combination thereof. In one embodiment, process 1000 is performed by calibration module 216.

At processing block 1010, print image measurement data (e.g., image of the test print) of a CMY mixture (e.g., tertiary color) is received. At processing block 1020, the OD measurement data included in the print image measurement data is used to determine the uniformity of the CMY mixture (e.g., color combination). At processing block 1030, the OD measurement data is used to perform uniformity compensation of the CMY mixture by generating uniformity compensated halftones for each pel forming element associated with the color cyan, the color magenta and yellow based on an inverse transfer function corresponding to the CMY mixture.

At decision block 1040, a determination is made as to whether OD variations for printed combination of cyan, magenta and yellow colors are less than or equal to the predetermined threshold. If so, the updated uniformity compensated halftones are transmitted, processing block 1050. Otherwise, if the OD variation for the printed CMY mixture (e.g., tertiary color combination) is not achieved, a test print image is printed using the uniformity compensated halftones and control is returned to processing block 1010, where the process is repeated upon receiving the subsequent print image measurement data of the CMY mixture test image (e.g., step chart). The print image measurement data, threshold data and target data in this case are for the tertiary colors for which the compensation is being done. The uniformity compensation for CMY may be done in combination with the compensation for secondary colors.

Figure 11:
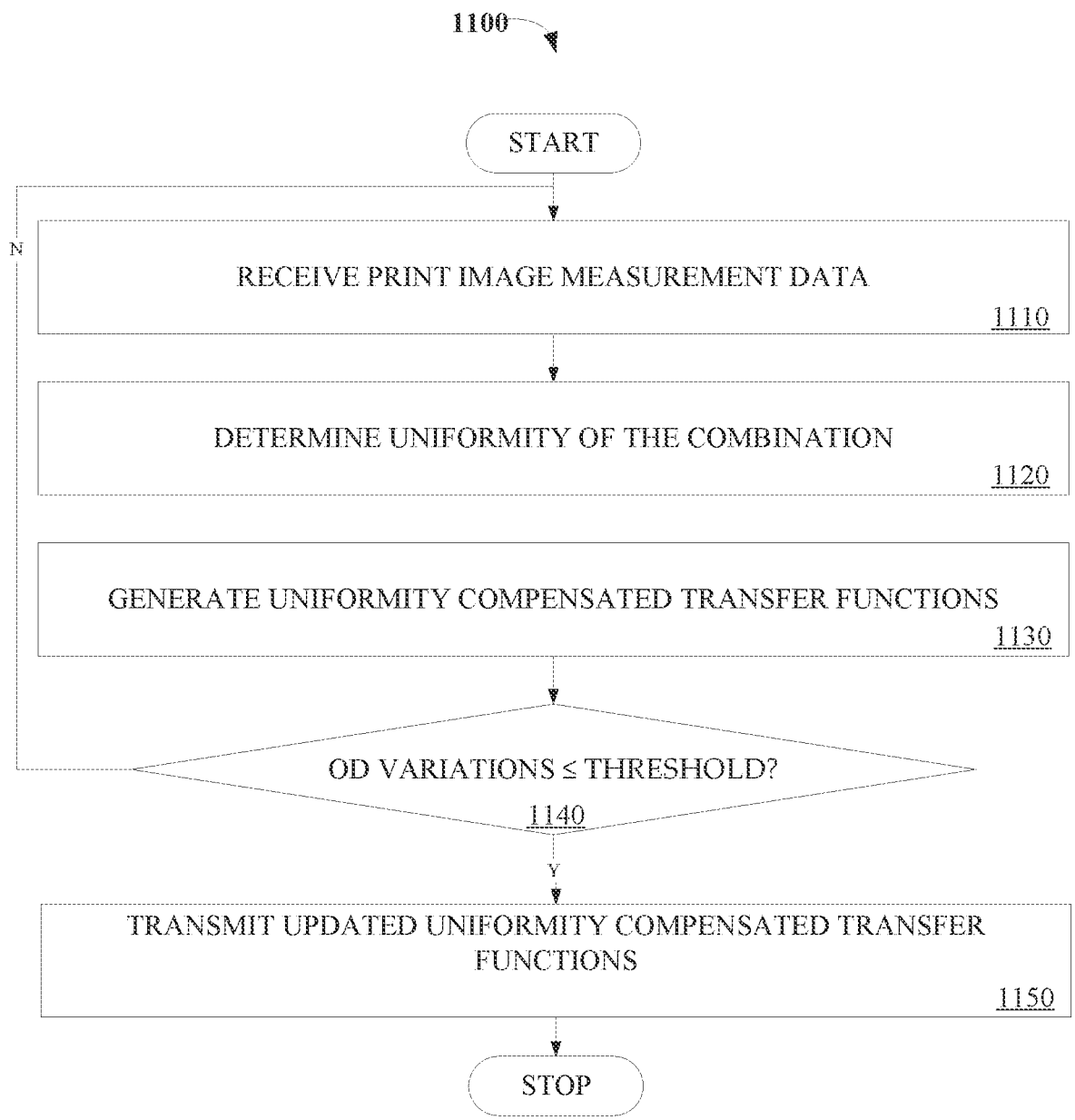
FIG. 11 illustrates another embodiment of a tertiary color uniformity compensation process performed by a printing system.

FIG. 11 is a flow diagram illustrating another process 1100 for performing uniformity compensation for tertiary colors. Process 1100 may be performed by processing logic that may include hardware (e.g., circuitry, dedicated logic, programmable logic, microcode, etc.), software such as instructions run on a processing device, or a combination thereof. In one embodiment, process 1100 is performed by calibration module 216.

At processing block 1110, measurement data (e.g., measurement of the test print) of a CMY mixture (e.g., a tertiary color) is received. At processing block 1120, the OD measurement data is used to determine the uniformity of the CMY mixture (e.g., the color combination). At processing block 1130, the OD measurement data is used to perform uniformity compensation of the CMY mixture by generating transfer compensation for each pel forming element associated with the color cyan, the color magenta and the color yellow.

At decision block 1140, a determination is made as to whether OD variations for the CMY color are less than or equal to the predetermined threshold. If so, the updated uniformity compensated transfer functions are transmitted, processing block 1150. Otherwise, a test print image is printed using the transfer functions and control is returned to processing block 1110, where the process is repeated upon receiving the subsequent print image measurement data.

For the initial measurement data for the CMY color a set of previously optimized transfer functions, set of identity transfer functions or engine calibration transfer functions for each primary color may be used. The print image measurement data, threshold data and target data in this case are for the tertiary colors for which the compensation is being done. Although described above with reference to OD measurement, calibration may be performed using perceptual lightness perceptual lightness (L*) implemented in the CIELAB color space (L*a*b*). In such embodiments, uniformity compensation is performed for secondary colors using L* as a target.

Figure 12:
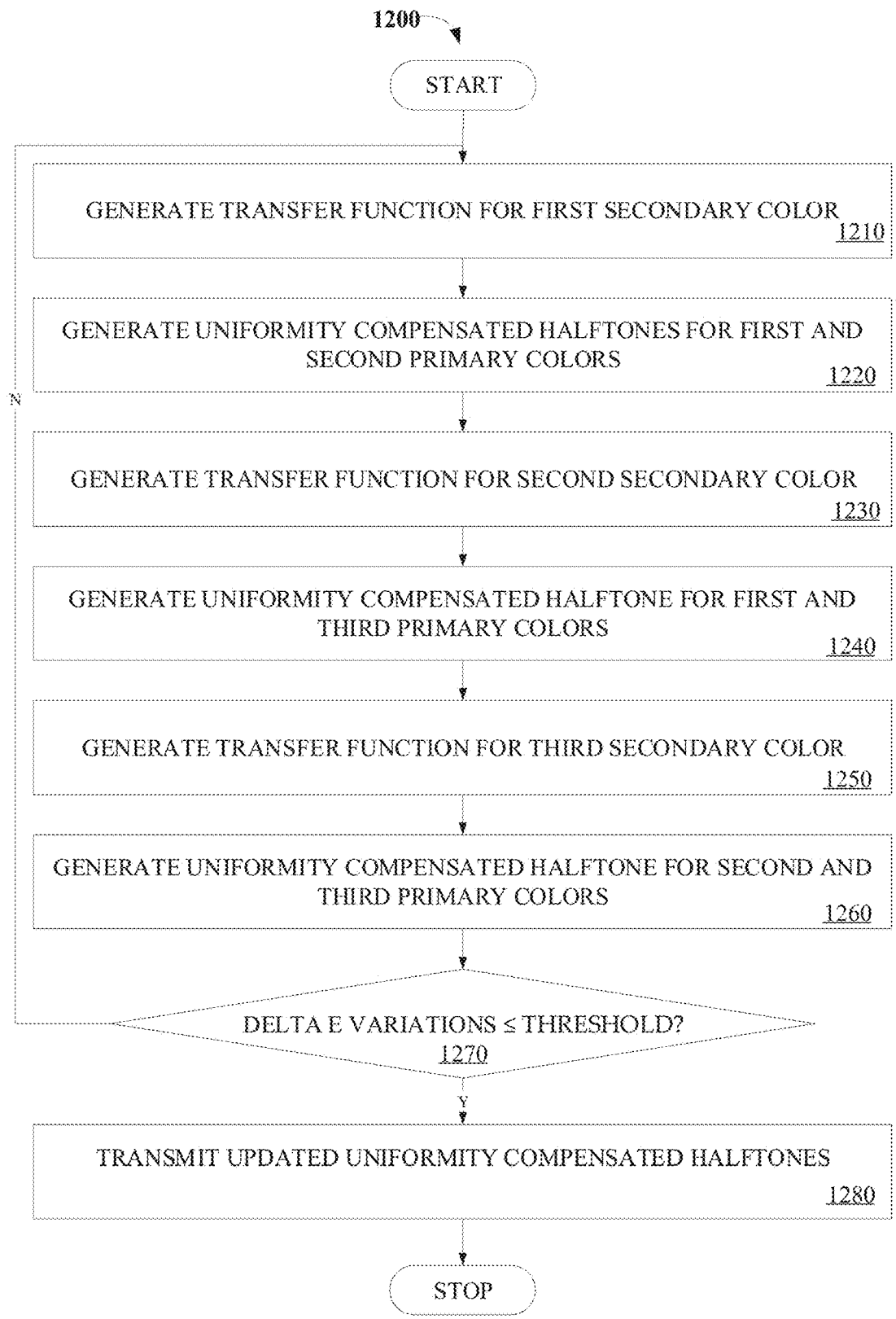
FIG. 12 illustrates yet another embodiment of a secondary color uniformity compensation process performed by a printing system.

FIG. 12 is a flow diagram illustrating one embodiment of a process 1200 for performing uniformity compensation for secondary colors using L* as a target. Process 1200 may be performed by processing logic that may include hardware (e.g., circuitry, dedicated logic, programmable logic, microcode, etc.), software such as instructions run on a processing device, or a combination thereof. In one embodiment, process 1200 is performed by calibration module 216.

At processing block 1210, uniformity compensation is performed for a first secondary color (e.g., red) using an equal mixture of yellow and magenta to generate a transfer function for the first secondary color using L* for the color as a target. At processing block 1220, uniformity compensation halftones for each pel forming element associated with a first primary color (e.g., yellow) and a second primary color (e.g., magenta) are generated based on an inverse transfer function corresponding to the generated red transfer function.

At processing block 1230, uniformity compensation is performed for a second secondary color (e.g., green) using an equal mixture of yellow and cyan to generate a transfer function for the second secondary color using L* for the color as a target. At processing block 1240, an updated uniformity compensation halftone is generated for each pel forming element associated with the first primary color, while a uniformity compensation halftone is generated for each pel forming element associated with a third primary color (e.g., cyan) based on an inverse transfer function corresponding to the generated green transfer function.

At processing block 1250, uniformity compensation is performed for a third secondary color (e.g., blue) using an equal mixture of cyan and magenta to generate a transfer function for the third secondary color using L* for the color as a target (e.g., Linear L* vs gray level). At processing block 1260, updated uniformity compensation halftones are generated for each pel forming element associated with the second primary color, and each pel forming element associated with the third primary color, based on an inverse transfer function corresponding to the generated blue transfer function. As discussed above, the updated uniformity compensation halftones are generated by modifying a uniformity compensation halftone using a uniformity compensation halftone previously generated for a respective primary color.

In this embodiment, the received print image measurement data includes L* measurement data. Thus, at decision block 1270, a determination is made as to whether variations based on Delta E (e.g., Delta E 1976 or Delta E 2000) for each secondary color is less than or equal to the predetermined threshold. If so, the updated uniformity compensated halftones are transmitted, processing block 1280. However, control is returned to processing block 1210, where the process is repeated using the updated uniformity compensated halftones upon a determination that the Delta E variations are greater than the predetermined threshold. As described previously, the starting point for the process uses uncalibrated halftones or previously calibrated halftones. The print image measurement data, threshold data and target data in this case are for the secondary colors for which the compensation is being done.

Figure 13:
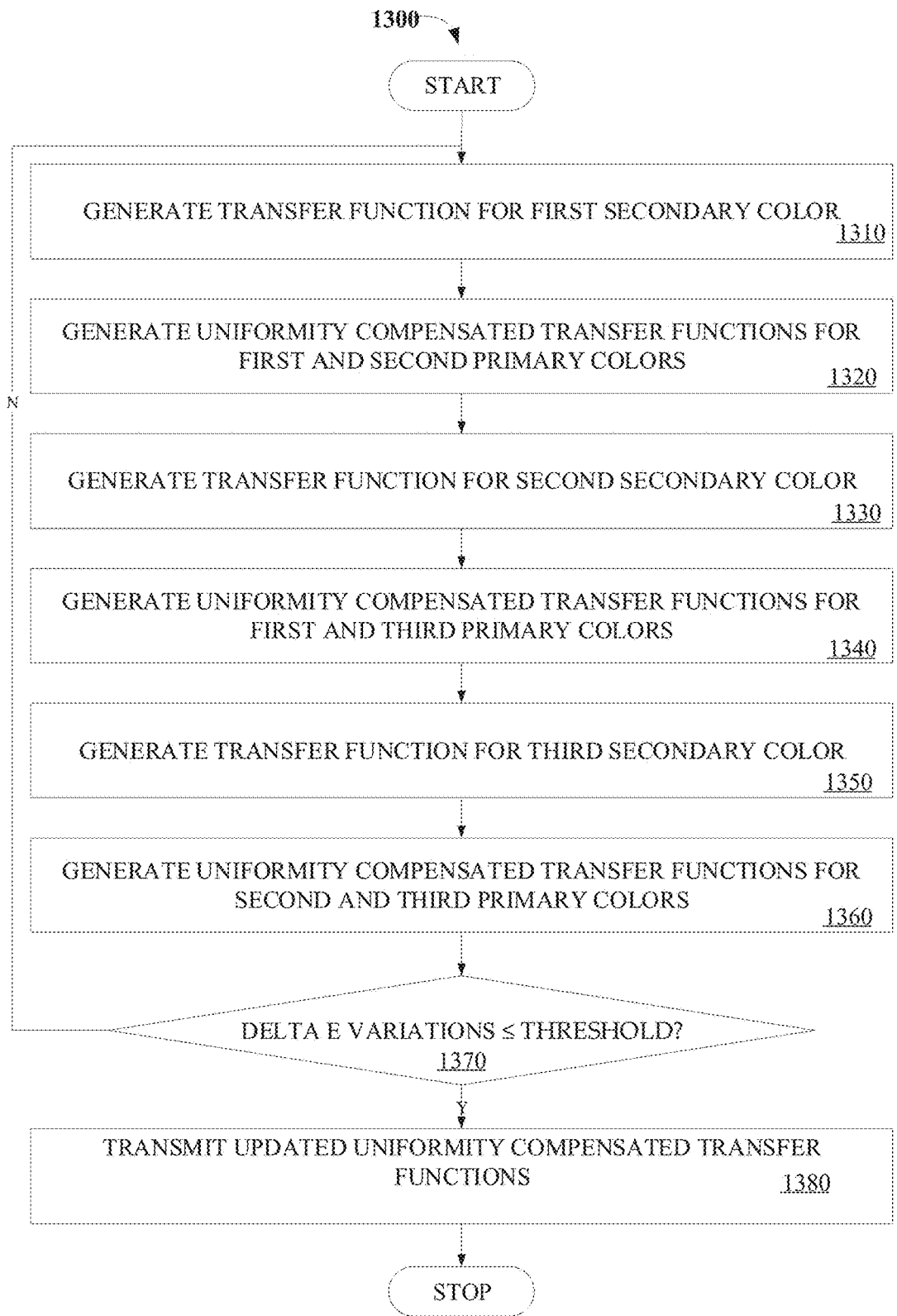
FIG. 13 illustrates still another embodiment of a secondary color uniformity compensation process performed by a printing system.

FIG. 13 is a flow diagram illustrating another process 1300 for performing uniformity compensation for secondary colors using L* as a target. Process 1300 may be performed by processing logic that may include hardware (e.g., circuitry, dedicated logic, programmable logic, microcode, etc.), software such as instructions run on a processing device, or a combination thereof. In one embodiment, process 1300 is performed by calibration module 216.

At processing block 1310, uniformity compensation is performed for a first secondary color (e.g., red) using an equal mixture of yellow and magenta to generate a transfer function for the first secondary color using L* for the color as a target. At processing block 1320, transfer functions for each pel forming element associated with a first primary color (e.g., yellow) and a second primary color (e.g., magenta) are generated based on the generated red transfer function.

At processing block 1330, uniformity compensation is performed for a second secondary color (e.g., green) using an equal mixture of yellow and cyan to generate a transfer function for the second secondary color using L* for the color as a target (e.g., Linear L* vs gray level). At processing block 1340, an updated transfer function is generated for each pel forming element associated with the first primary color, while a transfer function is generated for each pel forming element associated with a third primary color (e.g., cyan) based on the generated green transfer function.

At processing block 1350, uniformity compensation is performed for a third secondary color (e.g., blue) using an equal mixture of cyan and magenta to generate a transfer function for the third secondary color using L* for the color as a target. At processing block 1360, updated transfer functions are generated for each pel forming element associated with the second primary color, and each pel forming element associated with the third primary color, based on the generated blue transfer function. As discussed above, the updated transfer functions are generated by modifying a transfer function using a uniformity compensation transfer function previously generated for a respective primary color.

At processing block 1370, a determination is made as to whether delta E variations for each secondary color is less than or equal to the predetermined threshold. If so, the updated transfer functions are transmitted, processing block 1380. Otherwise, control is returned to processing block 1310, where the process is repeated using the updated transfer functions. The print image measurement data, threshold data and target data in this case are for the secondary colors for which the compensation is being done. As described previously, the starting point for the process uses uncalibrated halftones and identity or engine calibration transfer functions.

Arbitrary Color Uniformity Compensation

According to one embodiment, calibration module 216 may also perform uniformity compensation for arbitrary colors having different combinations of colors and tints. In such an embodiment, an arbitrary two-ink mixture (e.g., input blended color) of two inks (e.g., two primary color inks), X and Y (e.g., X=x and ink Y=y, where x≥y) may be considered an intermediate case between a primary and secondary color; where x and y are the tint levels for ink X and Y, respectively, defined such that tint level x is the majority tint level and y is the smaller minority tint level. As used herein, tint level may be defined as a color value expected to be produced by a print system given an input color value (e.g., the input color value for control of a primary color ink). Moreover, the terms tint and tint level may be considered analogous to color and color value, respectively. Thus, the terms x and y are equivalent to color values.

In a further embodiment, the minority tint y (of ink Y) is corrected via a secondary color correction transform (e.g., discussed above), while the majority tint x (of ink X) is corrected using a weighted blend of primary and secondary color correction transforms. In yet a further embodiment including three or more inks, all minority tints are corrected as secondary colors comprised of their ink and the majority ink X.

According to one embodiment, the primary color weight of ink X is represented as:

$$a = \frac{x-y}{x},$$

where a=1 if the minority tint y=0 and b=1 if minority tint y=x; and the secondary color weight is represented as $$b = \frac{y}{x},$$

such that a+b=1. In such an embodiment, a and b are determined based on a weighted average of x and y (e.g., as shown in equations above) and implemented as weights to generate corrected tints and corrected halftone designs.

Referring to FIG. 4, calibration module 216 also includes blend weight generation module 470, tint correction logic 480 and halftone correction logic 490 to perform uniformity compensation for the above-described arbitrary two-ink mixtures. In one embodiment, blend weight generation module 470 receives an image (e.g., included in print job data) having a blended input color. In such an embodiment, the blended input color comprises a value associated with a first primary color (or primary color value) and a value associated with a second primary color (or second primary color value).

In a further embodiment, blend weight generation module 470 generates blend weights for the blended input color based on the tint of the first primary color value and the tint of the second primary color value. In this embodiment, the blend weights comprise a primary color weight and a secondary color weight, and a tint comprises an areal density of a primary ink referred to a pel forming element 165. In another further embodiment, blend weight generation module 470 determines which of the two primary colors that comprise the input blended color is the majority color, designates that primary color as the first primary color and the other primary color as the second primary color.

Tint correction logic 480 generates uniformity corrected tints for the blended input color based on the blend weights and a plurality of received transfer functions (e.g., transfer functions corresponding to iteratively generated uniformity compensated primary color transfer functions and uniformity compensated secondary color transfer functions discussed above), as defined by:

$$\frac{x'}{y'} = \frac{aTF_X(x) + bTF_{XY\_X}(x)}{TF_{XY\_Y}(y)},$$

Where $$x'$$
$$y'$$

represents corrected tints for X=x and Y=y; $TF_X$ represents a transfer function associated with ink X as a primary color; $TF_{XY\_X}$ represents a transfer function associated with inks X and Y derived from X+Y as a secondary color and applied to ink X; $TF_{XY\_Y}$ represents a transfer function associated with inks X and Y derived from X+Y as a secondary color and applied to ink Y, weighting factor a represents a primary color weight, weighting factor b represents a secondary color weight; x represents a majority tint; and y represents a minority tint. $TF_{XY\_X}$ and $TF_{XY\_Y}$ may be determined based on process 900 or similar process.

Based on the above equation, tint correction logic 480 applies the plurality of transfer functions to a first primary color value and a second primary color value included in the blended input color to generate a transformed first primary color value and a transformed second primary color value. Thus, a first transfer function associated with the first primary color is applied, while a second transfer function associated with the first primary color and the second primary color is applied.

Subsequently, tint correction logic 480 applies the blend weights to the transformed first primary color value and the transformed second primary color value to generate a uniformity corrected first primary color value and a uniformity corrected second primary color value associated with the blended input color. According to one embodiment, the uniformity corrected first primary color value and the uniformity corrected second primary color value comprise corrected tints.

In a further embodiment, the corrected tint associated with the uniformity corrected first primary color value comprises a majority tint, while the corrected tint associated with the uniformity corrected second primary color value comprises a minority tint. Thus, the corrected tints comprise a majority tint corrected using the first transfer function and a minority tint corrected using the second transfer function.

According to one embodiment, tint correction logic 480 transmits the majority tint and the minority tint as corrected tints. In such an embodiment, the corrected tints may be received at print engine 160.

Figure 14:
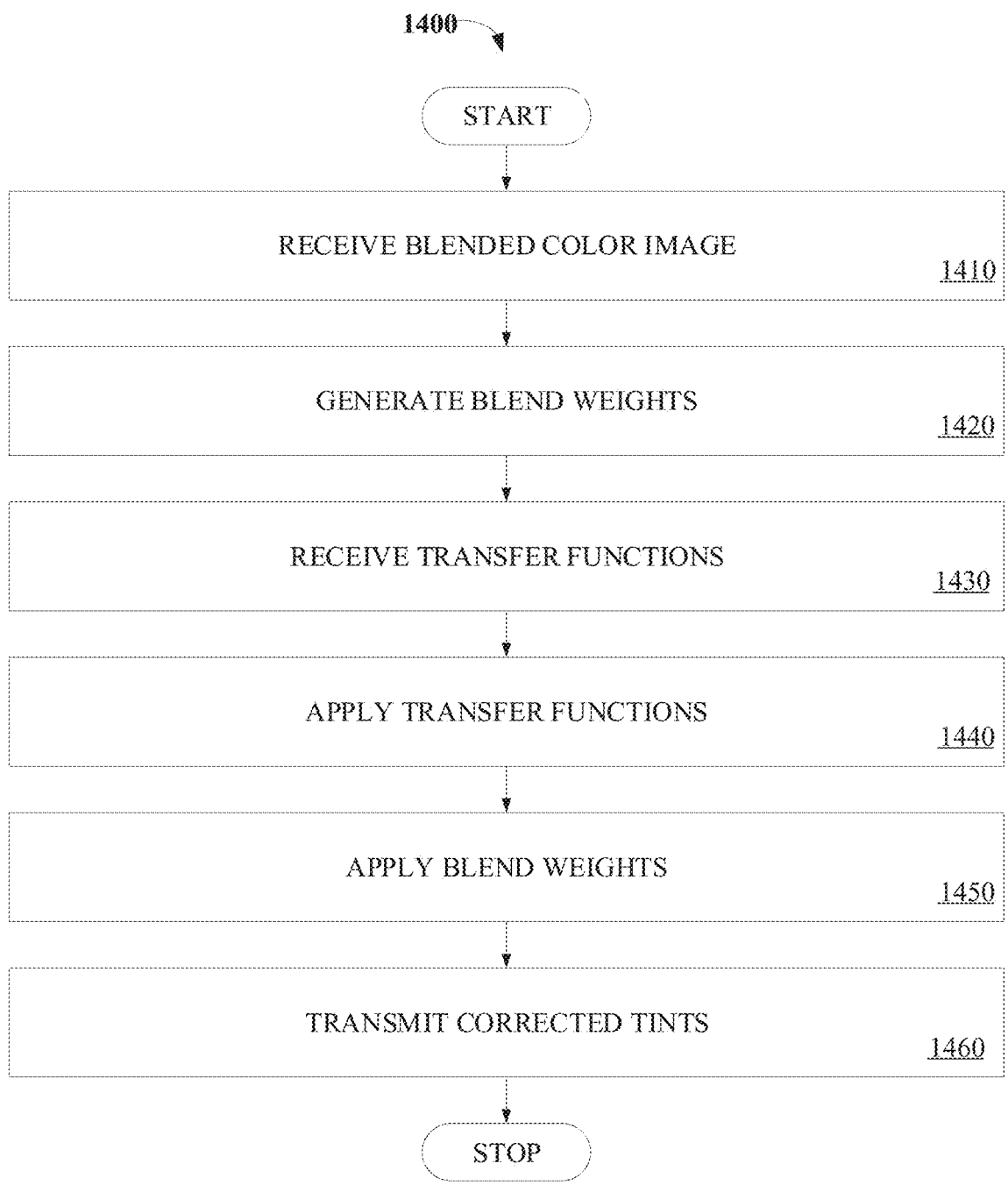
FIG. 14 illustrates one embodiment of a tint correction process performed by a printing system.

FIG. 14 is a flow diagram illustrating another process 1400 for generating corrected tints for an arbitrary blended color. Process 1400 may be performed by processing logic that may include hardware (e.g., circuitry, dedicated logic, programmable logic, microcode, etc.), software such as instructions run on a processing device, or a combination thereof. In one embodiment, process 1400 is performed by calibration module 216.

Process 1400 begins at processing block 1410, where an image having a blended input color is received. As discussed above, the blended input color comprises a first primary color value and a second primary color value. At processing block 1420, blend weights for the blended input color are generated based on a tint of the first primary color value and a tint of the second primary color value.

At processing block 1430, transfer functions corresponding to the first primary color value, as well as transfer functions corresponding to the second primary color value, are received. At processing block 1440, the transfer functions are applied to the first primary color value and the second primary color value to generate a transformed first primary color value and a transformed second primary color value.

At processing block 1450, the blend weights are applied to the transformed first primary color value and the transformed second primary color value to generate a uniformity corrected first primary color value and a uniformity corrected second primary color value associated with the blended input color. As discussed above, the uniformity corrected first primary color and uniformity corrected second primary color values comprise corrected tints. At processing block 1460, the corrected tints are transmitted.

Referring again to FIG. 4, halftone correction logic 490 generates uniformity corrected halftones designs for the blended input color based on the blend weights and a plurality of received halftone threshold arrays (e.g., threshold arrays corresponding to iteratively generated uniformity compensated primary color halftones and secondary color halftones discussed above), as defined by:

$$\frac{h'_{xijk}}{h'_{yijk}} = \frac{ah_{Xijk} + bh_{XYijk\_X}}{h_{XYijk\_Y}},$$

where $$\frac{h'_{xijk}}{h'_{yijk}}$$

represents corrected halftone designs for X=x and Y=y; $h_{Xijk}$ represents a threshold array for pixel (i,j) and drop transition k derived from primary color X; $h_{XYijk\_X}$ represents a threshold array for pixel (i,j) and drop transition k derived from X+Y as a secondary color and applied to ink X; $h_{XYijk\_Y}$ represents a threshold array for pixel (i,j) and drop transition k derived from X+Y as a secondary color and applied to ink Y; weighting factor a represents the primary color weight, and weighting factor b represents the secondary color weight. $h_{XYijk\_X}$ and $h_{XYijk\_Y}$ may be determined based on process 800 or similar process.

Based on the above equation, halftone correction logic 490 applies the plurality of threshold arrays to a first primary color value and a second primary color value included in the blended input color to generate a first primary color halftone and a second primary color halftone for each pixel and drop transition. Thus, a first halftone design associated with the first primary color is applied, while a second halftone design associated with the first primary color and the second primary color is applied.

Figure 15:
FIG. 15 illustrates one embodiment of a halftone correction process performed by a printing system.

FIG. 15 is a flow diagram illustrating another process 1500 for generating corrected halftones for an arbitrary blended color. Process 1500 may be performed by processing logic that may include hardware (e.g., circuitry, dedicated logic, programmable logic, microcode, etc.), software such as instructions run on a processing device, or a combination thereof. In one embodiment, process 1500 is performed by calibration module 216.

Process 1500 begins at processing block 1510, where an image having a blended input color is received. At processing block 1520, blend weights for the blended input color are generated based on a tint of the first primary color value and a tint of the second primary color value.

At processing block 1530, halftone threshold arrays corresponding to the first primary color value, as well as halftone threshold arrays corresponding to the second primary color value, are received. At processing block 1540, the threshold arrays are applied to the first primary color value and the second primary color value to generate a first primary color halftone and a transformed second primary color halftone, respectively.

At processing block 1550, the blend weights are applied to the first primary color halftone and the second primary color halftone to generate a uniformity corrected first primary color halftone design and a uniformity corrected second primary halftone design associated with the blended input color. At processing block 1560, the corrected halftone designs are transmitted. In such an embodiment, the corrected halftone designs may be received at print engine 160.

Figure 16:
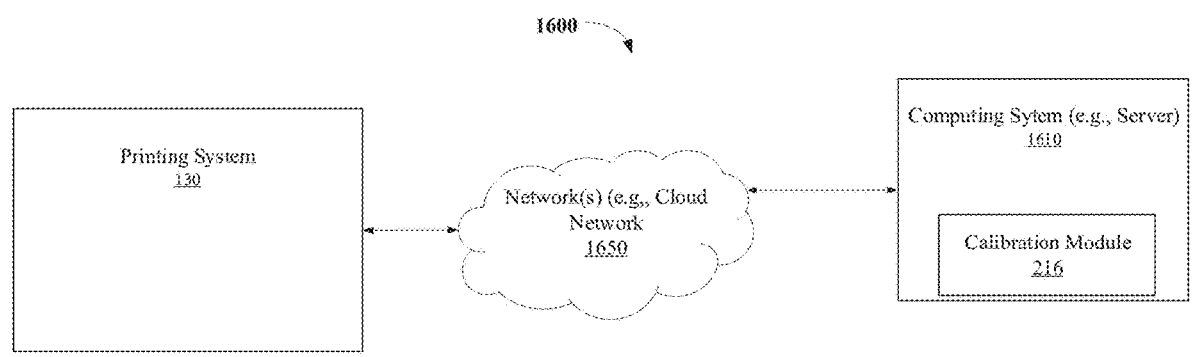
FIG. 16 illustrates one embodiment of a calibration module implemented in a network.

Although shown as a component of print controller 140, other embodiments may feature calibration module 216 included within an independent device, or combination of devices, communicably coupled to print controller 140. For instance, FIG. 16 illustrates one embodiment of a calibration module 216 implemented in a network 1600. As shown in FIG. 16, calibration module 216 is included within a computing system 1610 and transmits calibrated halftones and/or transfer functions to printing system 130 via a cloud network 1650. Printing system 130 receives calibrated halftones and/or transfer functions.

Figure 17:
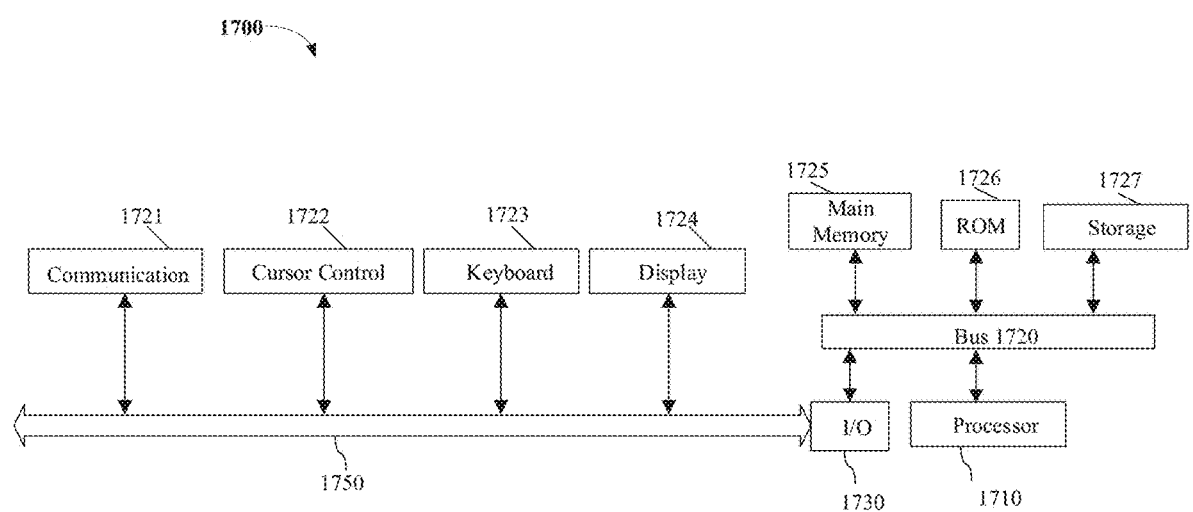
FIG. 17 illustrates one embodiment of a computer system.

FIG. 17 illustrates a computer system 1700 on which printing system 130 and/or calibration module 216 may be implemented. Computer system 1700 includes a system bus 1720 for communicating information, and a processor 1710 coupled to bus 1720 for processing information.

Computer system 1700 further comprises a random access memory (RAM) or other dynamic storage device 1725 (referred to herein as main memory), coupled to bus 1720 for storing information and instructions to be executed by processor 1710. Main memory 1725 also may be used for storing temporary variables or other intermediate information during execution of instructions by processor 1710. Computer system 1700 also may include a read only memory (ROM) and or other static storage device 1726 coupled to bus 1720 for storing static information and instructions used by processor 1710.

A data storage device 1727 such as a magnetic disk or optical disc and its corresponding drive may also be coupled to computer system 1700 for storing information and instructions. Computer system 1700 can also be coupled to a second I/O bus 1750 via an I/O interface 1730. A plurality of I/O devices may be coupled to I/O bus 1750, including a display device 1724, an input device (e.g., an alphanumeric input device 1723 and or a cursor control device 1722). The communication device 1721 is for accessing other computers (servers or clients). The communication device 1721 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store calibration logic and one or more processors coupled with the at least one physical memory device to execute the calibration logic to receive an image having a blended input color comprising a first primary color value and a second primary color value, generate blend weights for the blended input color based on the first primary color value and the second primary color value, receive a plurality of transfer functions corresponding to each of the first primary color value and the second primary color values and apply the blend weights and the plurality of transfer functions to the first primary color value and the second primary color value to generate a uniformity corrected first primary color value and a uniformity corrected second primary color value associated with the blended input color.

Example 2 includes the subject matter of Example 1, wherein applying the plurality of transfer functions comprises applying a first transfer function associated with the first primary color, and applying a second transfer function associated with the first primary color and the second primary color.

Example 3 includes the subject matter of Examples 1 and 2, wherein generating the uniformity corrected first primary color value and the uniformity corrected second primary color value comprises generating corrected color values for the first primary color value and the second primary color value.

Example 4 includes the subject matter of Examples 1-3, wherein the calibration logic determines a first primary color that comprises the input blended color is a majority color, designates the primary color as the first primary color and designates a second primary color that comprises the input blended color as the second primary color.

Example 5 includes the subject matter of Examples 1-4, wherein the blend weights comprise a primary color weight and a secondary color weight, the primary color weight is applied to the first transfer function and the secondary color weight is applied to the second transfer function.

Example 6 includes the subject matter of Examples 1-5, wherein the blend weights are determined based on a weighted average of the first primary color value and the second primary color value.

Example 7 includes the subject matter of Examples 1-6, wherein the calibration logic further transmits the uniformity corrected first primary color value and the uniformity corrected second primary color value.

Example 8 includes the subject matter of Examples 1-7, further comprising a print engine to receive and print the uniformity corrected first primary color value and the uniformity corrected second primary color value.

Some embodiments pertain to Example 9 that includes a method comprising receiving an image having a blended input color comprising a first primary color value and a second primary color value, generating blend weights for the blended input color based on the first primary color value and the second primary color value, receiving a plurality of transfer functions corresponding to each of the first primary color value and the second primary color values and applying the blend weights and the plurality of transfer functions to the first primary color value and the second primary color value to generate a uniformity corrected first primary color value and a uniformity corrected second primary color value associated with the blended input color.

Example 10 includes the subject matter of Example 9, wherein applying the plurality of transfer functions comprises applying a first transfer function associated with the first primary color, and applying a second transfer function associated with the first primary color and the second primary color.

Example 11 includes the subject matter of Examples 9 and 10, wherein generating the uniformity corrected first primary color value and the uniformity corrected second primary color value comprises generating corrected color values for the first primary color value and the second primary color value.

Example 12 includes the subject matter of Examples 9-11, further comprising determining a first primary color that comprises the input blended color is a majority color, designating the primary color as the first primary color and designating a second primary color that comprises the input blended color as the second primary color.

Example 13 includes the subject matter of Examples 9-12, wherein the blend weights comprise a primary color weight and a secondary color weight, the primary color weight is applied to the first transfer function and the secondary color weight is applied to the second transfer function.

Example 14 includes the subject matter of Examples 9-13, wherein the blend weights are determined based on a weighted average of the first primary color value and the second primary color value.

Some embodiments pertain to Example 15 that includes at least one computer readable medium having instructions stored thereon, which when executed by one or more processors, cause the processors to receive an image having a blended input color comprising a first primary color value and a second primary color value, generate blend weights for the blended input color based on the first primary color value and the second primary color value, receive a plurality of transfer functions corresponding to each of the first primary color value and the second primary color values and apply the blend weights and the plurality of transfer functions to the first primary color value and the second primary color value to generate a uniformity corrected first primary color value and a uniformity corrected second primary color value associated with the blended input color.

Example 16 includes the subject matter of Example 15, wherein applying the plurality of transfer functions comprises applying a first transfer function associated with the first primary color, and applying a second transfer function associated with the first primary color and the second primary color.

Example 17 includes the subject matter of Examples 15 and 16, wherein generating the uniformity corrected first primary color value and the uniformity corrected second primary color value comprises generating corrected color values for the first primary color value and the second primary color value.

Example 18 includes the subject matter of Examples 15-17, having instructions stored thereon, which when executed by one or more processors, further cause the processors to determine a first primary color that comprises the input blended color is a majority color, designate the primary color as the first primary color and designate a second primary color that comprises the input blended color as the second primary color.

Example 19 includes the subject matter of Examples 15-18, wherein the blend weights comprise a primary color weight and a secondary color weight, the primary color weight is applied to the first transfer function and the secondary color weight is applied to the second transfer function.

Example 20 includes the subject matter of Examples 15-19, wherein the blend weights are determined based on a weighted average of the first primary color value and the second primary color value.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store calibration logic; and
   one or more processors coupled with the at least one physical memory device to execute the calibration logic to:
   receive an image having a blended input color comprising a first primary color value and a second primary color value;
   receive a plurality of transfer functions corresponding to each of the first primary color value and the second primary color values;
   generate weighting factors for the blended input color based on the first primary color value and the second primary color value; and
   apply the weighting factors to the plurality of transfer functions to generate a uniformity corrected first primary color value and a uniformity corrected second primary color value associated with the blended input color, wherein the uniformity corrected first primary color value and the uniformity corrected second primary color value are applied to image data to print image data to a print medium.

2. The system of claim 1, wherein applying the plurality of transfer functions comprises applying a first transfer function associated with a first primary color, and applying a second transfer function associated with the first primary color and a second primary color.

3. The system of claim 1, wherein generating the uniformity corrected first primary color value and the uniformity corrected second primary color value comprises generating corrected color values for the first primary color value and the second primary color value.

4. The system of claim 2, wherein the calibration logic determines the first primary color that comprises the input blended color is a majority color, designates the primary color as the first primary color and designates a second primary color that comprises the input blended color as the second primary color.

5. The system of claim 2, wherein the weighting factors comprise a primary color weight and a secondary color weight, the primary color weight is applied to the first transfer function and the secondary color weight is applied to the second transfer function.

6. The system of claim 1, wherein the weighting factors are determined based on a weighted average of the first primary color value and the second primary color value.

7. The system of claim 1, wherein the calibration logic further transmits the uniformity corrected first primary color value and the uniformity corrected second primary color value to a print engine.

8. The system of claim 7, further comprising the print engine to receive and print the uniformity corrected first primary color value and the uniformity corrected second primary color value.

9. A method comprising:
receiving an image having a blended input color comprising a first primary color value and a second primary color value;
receiving a plurality of transfer functions corresponding to each of the first primary color value and the second primary color values;
generating weighting factors for the blended input color based on the first primary color value and the second primary color value; and
applying the weighting factors to the plurality of transfer functions to generate a uniformity corrected first primary color value and a uniformity corrected second primary color value associated with the blended input color, wherein the uniformity corrected first primary color value and the uniformity corrected second primary color value are applied to image data to print image data to a print medium.

10. The method of claim 9, wherein applying the plurality of transfer functions comprises:
applying a first transfer function associated with a first primary color; and
applying a second transfer function associated with the first primary color and a second primary color.

11. The method of claim 9, wherein generating the uniformity corrected first primary color value and the uniformity corrected second primary color value comprises generating corrected color values for the first primary color value and the second primary color value.

12. The method of claim 10, further comprising:
determining the first primary color that comprises the input blended color is a majority color;
designating the primary color as the first primary color; and
designating a second primary color that comprises the input blended color as the second primary color.

13. The method of claim 10, wherein the weighting factors comprise a primary color weight and a secondary color weight, the primary color weight is applied to the first transfer function and the secondary color weight is applied to the second transfer function.

14. The method of claim 9, wherein the weighting factors are determined based on a weighted average of the first primary color value and the second primary color value.

15. At least one non-transitory computer readable medium having instructions stored thereon, which when executed by one or more processors, cause the processors to:
receive an image having a blended input color comprising a first primary color value and a second primary color value;
receive a plurality of transfer functions corresponding to each of the first primary color value and the second primary color values;
generate weighting factors for the blended input color based on the first primary color value and the second primary color value; and
apply the weighting factors to the plurality of transfer functions to generate a uniformity corrected first primary color value and a uniformity corrected second primary color value associated with the blended input color, wherein the uniformity corrected first primary color value and the uniformity corrected second primary color value are applied to image data to print image data to a print medium.

16. The computer readable medium of claim 15, wherein applying the plurality of transfer functions comprises:
applying a first transfer function associated with a first primary color; and
applying a second transfer function associated with the first primary color and a second primary color.

17. The computer readable medium of claim 15, wherein generating the uniformity corrected first primary color value and the uniformity corrected second primary color value comprises generating corrected color values for the first primary color value and the second primary color value.

18. The computer readable medium of claim 16, having instructions stored thereon, which when executed by one or more processors, further cause the processors to:
determine the first primary color that comprises the input blended color is a majority color;
designate the primary color as the first primary color; and
designate a second primary color that comprises the input blended color as the second primary color.

19. The computer readable medium of claim 16, wherein the weighting factors comprise a primary color weight and a secondary color weight, the primary color weight is applied to the first transfer function and the secondary color weight is applied to the second transfer function.

20. The computer readable medium of claim 15, wherein the weighting factors are determined based on a weighted average of the first primary color value and the second primary color value.

* * * * *